(12) United States Patent
Okuno et al.

(10) Patent No.: US 6,937,256 B2
(45) Date of Patent: Aug. 30, 2005

(54) DISPLAY DEVICE AND IMAGE DISPLAYING METHOD

(75) Inventors: Yoshiaki Okuno, Tokyo (JP); Jun Someya, Tokyo (JP); Kazuya Maeshima, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 260 days.

(21) Appl. No.: 10/101,466

(22) Filed: Mar. 20, 2002

(65) Prior Publication Data

US 2002/0167465 A1 Nov. 14, 2002

(30) Foreign Application Priority Data

Mar. 21, 2001 (JP) ........................................ 2001-080851

(51) Int. Cl.[7] .................................................. G09G 5/10
(52) U.S. Cl. ...................................................... 345/690
(58) Field of Search ............................. 345/82–85, 167, 345/2.1, 3.3, 1.3, 147–154, 127, 132, 339, 467, 690, 707, 743, 750–757, 771, 327, 328; 356/497, 450, 511, 479, 458, 530, 532, 516; 382/261, 248, 50

(56) References Cited

U.S. PATENT DOCUMENTS

| | | | | |
|---|---|---|---|---|
| 4,953,114 A | * | 8/1990 | Sato | 382/237 |
| 5,032,903 A | * | 7/1991 | Suzuki et al. | 358/530 |
| 5,283,657 A | * | 2/1994 | Ichikawa et al. | 358/296 |
| 5,300,942 A | * | 4/1994 | Dolgoff | 345/32 |
| 5,333,243 A | * | 7/1994 | Best et al. | 358/1.9 |
| 5,361,147 A | * | 11/1994 | Katayama et al. | 358/532 |
| 5,589,852 A | * | 12/1996 | Thompson et al. | 345/690 |
| 5,604,825 A | * | 2/1997 | Hirota et al. | 382/261 |
| 5,818,970 A | * | 10/1998 | Ishikawa et al. | 382/248 |
| 5,900,982 A | * | 5/1999 | Dolgoff et al. | 359/619 |
| 6,072,830 A | * | 6/2000 | Proctor et al. | 375/240.22 |
| 6,133,902 A | * | 10/2000 | Ohkubo et al. | 345/690 |
| 6,144,352 A | | 11/2000 | Matsuda et al. | |
| 6,246,827 B1 | * | 6/2001 | Strolle et al. | 386/33 |
| 6,611,241 B1 | * | 8/2003 | Firester et al. | 345/1.3 |
| 6,775,006 B2 | * | 8/2004 | Groot et al. | 356/497 |
| 6,816,287 B1 | * | 11/2004 | Sakaguchi | 358/474 |
| 2004/0221143 A1 | * | 11/2004 | Wise et al. | 712/300 |
| 2004/0233185 A1 | * | 11/2004 | Hashimoto et al. | 345/204 |

FOREIGN PATENT DOCUMENTS

JP   2000020025   1/2000

* cited by examiner

*Primary Examiner*—Vijay Shankar
*Assistant Examiner*—Prabodh Dharia
(74) *Attorney, Agent, or Firm*—Birch, Stewart, Kolasch & Birch, LLP

(57) ABSTRACT

An apparatus and method are disclosed for displaying an image having high frequency components. The image is displayed on a display device that includes a plurality of display elements arranged in both horizontal and vertical directions. The display elements represent colors, such as red, green and blue. A pixel data generator generates for each display element first pixel data corresponding to the luminance levels of red, green and blue colors in the image. A smoothing filter eliminates false colors in the image by applying weighting coefficients to the first pixel data to modify the luminance levels of the first pixel data, thereby producing second pixel data having second color element data corresponding to luminance levels of the respective colors. Each display element of the display is driven in accordance with the second color element data.

20 Claims, 37 Drawing Sheets

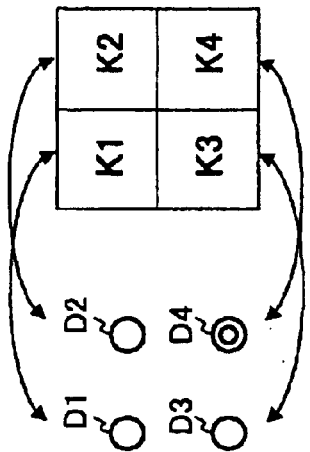
*Fig.4B*
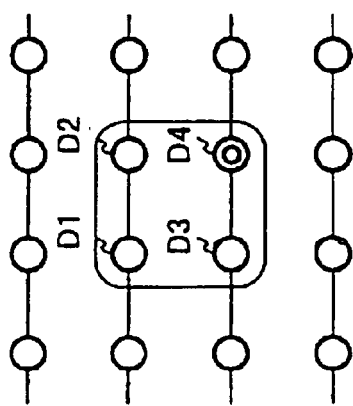
*Fig.4A*
| (K2) 0 | (K4) 1 |
|---|---|
| (K1) 0 | (K3) 0 |
*Fig.5C*
| (K2) 0.2 | (K4) 0.5 |
|---|---|
| (K1) 0.1 | (K3) 0.2 |
*Fig.5B*
| (K2) 0.25 | (K4) 0.25 |
|---|---|
| (K1) 0.25 | (K3) 0.25 |
*Fig.5A*

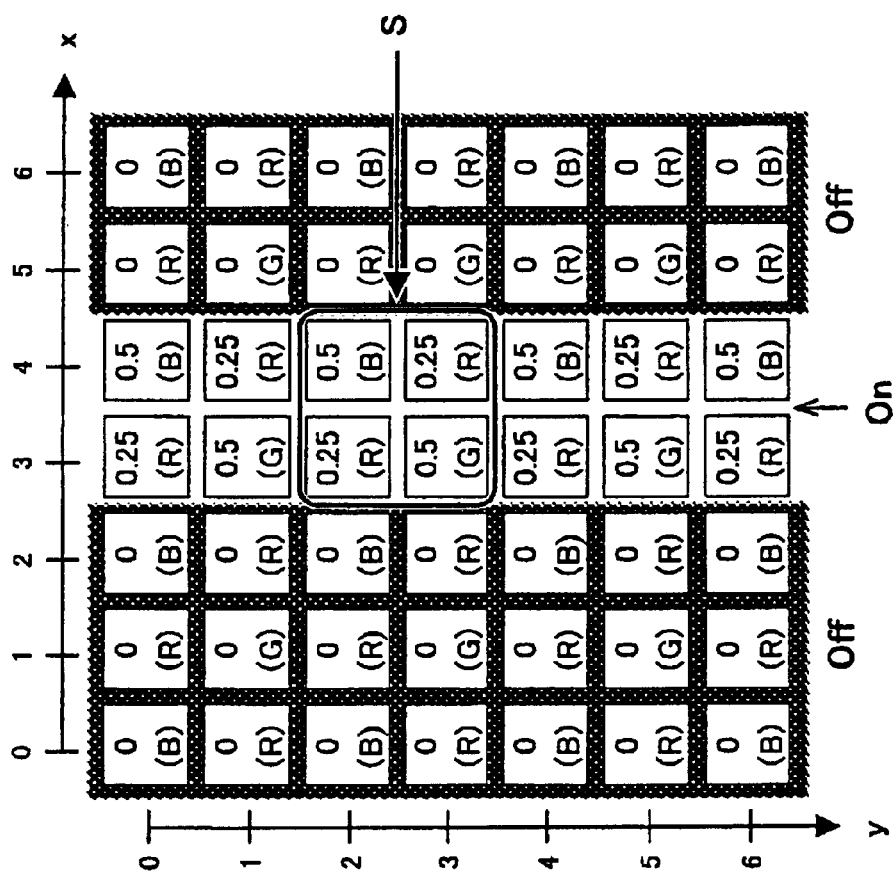

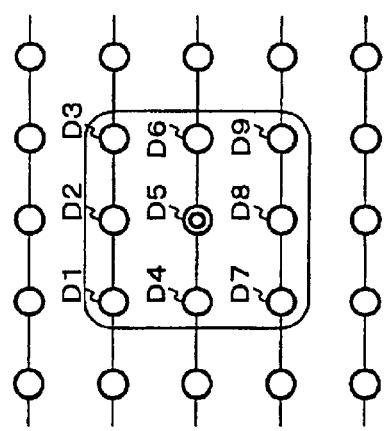

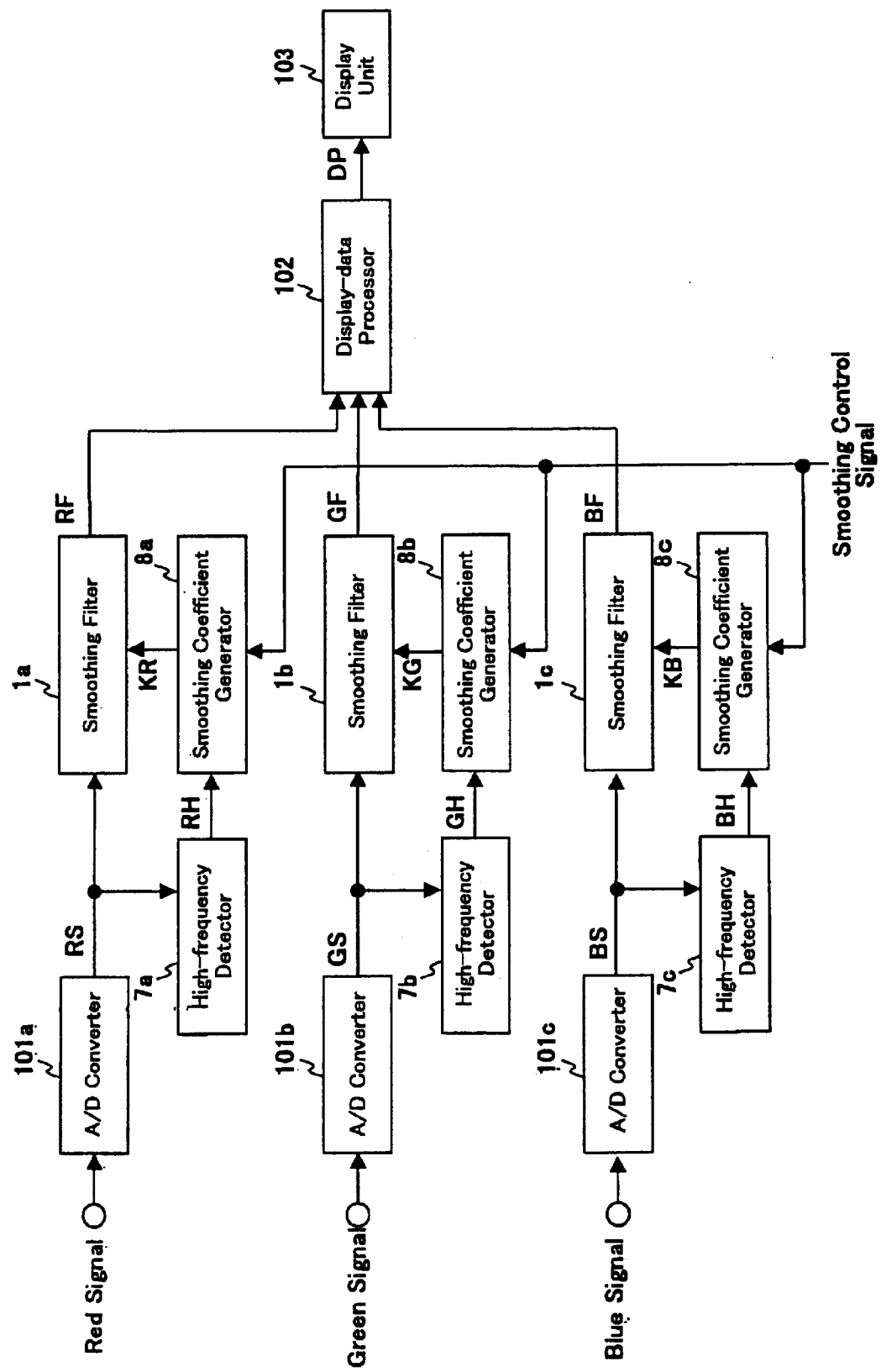

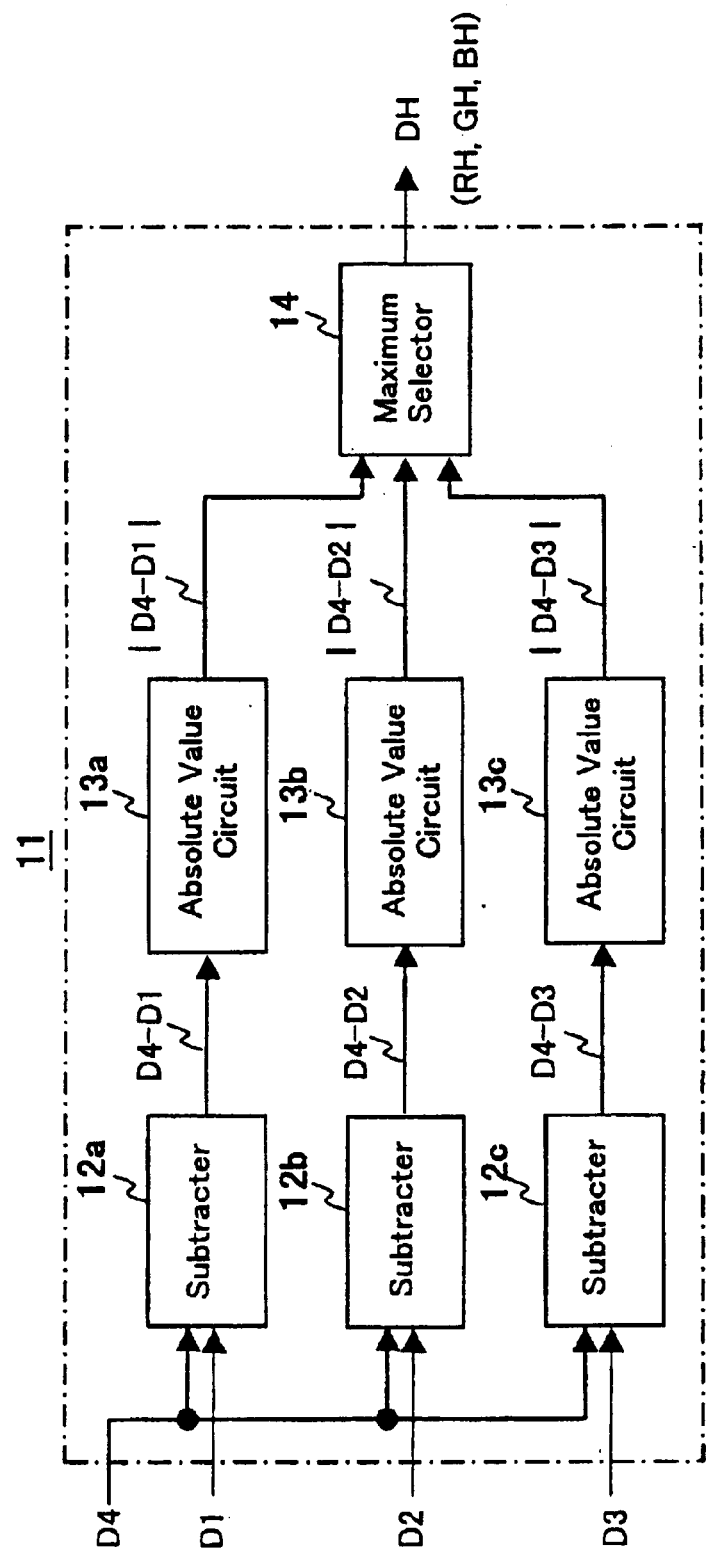

Fig.14

| DH | KD1 | KD2 | KD3 | KD4 |
|---|---|---|---|---|
| 0/255 | KD1(0) | KD2(0) | KD3(0) | KD4(0) |
| 1/255 | KD1(1) | KD2(1) | KD3(1) | KD4(1) |
| 2/255 | KD1(2) | KD2(2) | KD3(2) | KD4(2) |
| 3/255 | KD1(3) | KD2(3) | KD3(3) | KD4(3) |
| .. | .. | .. | .. | .. |
| 255/255 | KD1(255) | KD2(255) | KD3(255) | KD4(255) |

Fig.31A (RS, GS, BS)

| 1 | 1 | 0 | 0 |
|---|---|---|---|
| 1 | 1 | 0 | 0 |
| 0 | 0 | 1 | 1 |
| 0 | 0 | 1 | 1 |

Fig.31B (RF, GF, BF)

| 0.5 | 0.5 | 0.5 | 0.5 |
|---|---|---|---|
| 0.5 | 1 | 0.5 | 0 |
| 0.5 | 0.5 | 0.5 | 0.5 |
| 0.5 | 0 | 0.5 | 1 |

Fig.31C (RT, GT, BT)

| 0.25 | 0.25 | 0.25 | 0.25 |
|---|---|---|---|
| 0.25 | 1 | 0.25 | 0 |
| 0.25 | 0.25 | 0.25 | 0.25 |
| 0.25 | 0 | 0.25 | 1 |

Fig.31D DP

| 0.25 B | 0.125 R | 0.25 B | 0.125 R |
|---|---|---|---|
| 0.125 R | 1 G | 0.125 R | 0 G |
| 0.25 B | 0.125 R | 0.25 B | 0.125 R |
| 0.125 R | 0 G | 0.125 R | 1 G |

Fig.32A

| 1 | 1 | 0 | 0 |
|---|---|---|---|
| 1 | 1 | 0 | 0 |
| 0 | 0 | 1 | 1 |
| 0 | 0 | 1 | 1 |

| 1 | 1 | 0 | 0 |
|---|---|---|---|
| 1 | 1 | 0 | 0 |
| 0 | 0 | 1 | 1 |
| 0 | 0 | 1 | 1 |

| 0.5 | 0.5 | 0.5 | 0.5 |
|---|---|---|---|
| 0.5 | 1 | 0.5 | 0 |
| 0.5 | 0.5 | 0.5 | 0.5 |
| 0.5 | 0 | 0.5 | 1 |

| 0.5 B | 0.25 R | 0.5 B | 0.25 R |
|---|---|---|---|
| 0.25 R | 1 G | 0.25 R | 0 G |
| 0.5 B | 0.25 R | 0.5 B | 0.25 R |
| 0.25 R | 0 G | 0.25 R | 1 G |

DP

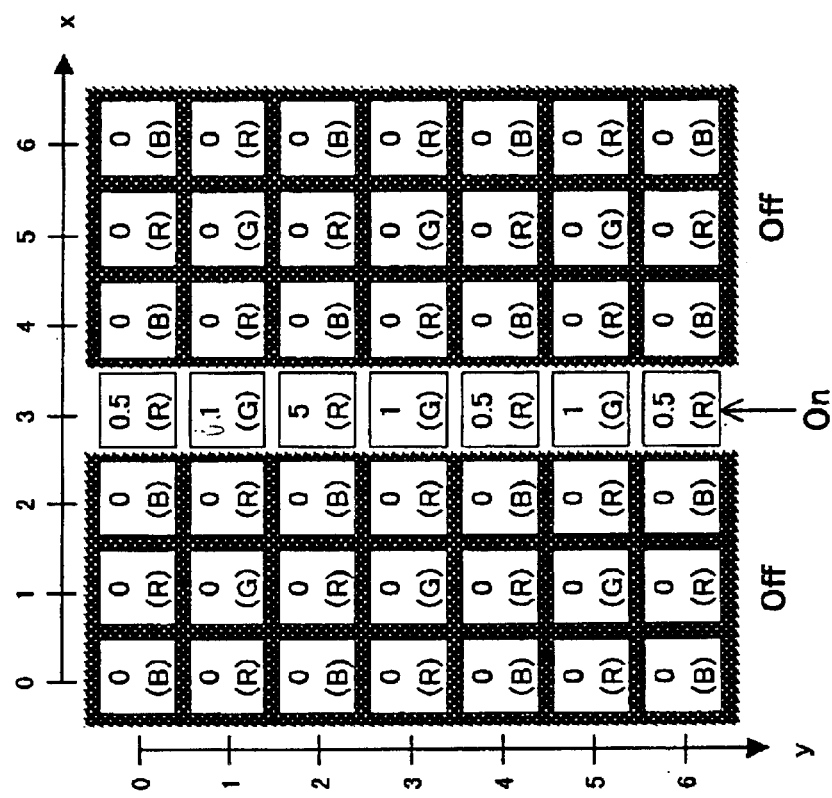
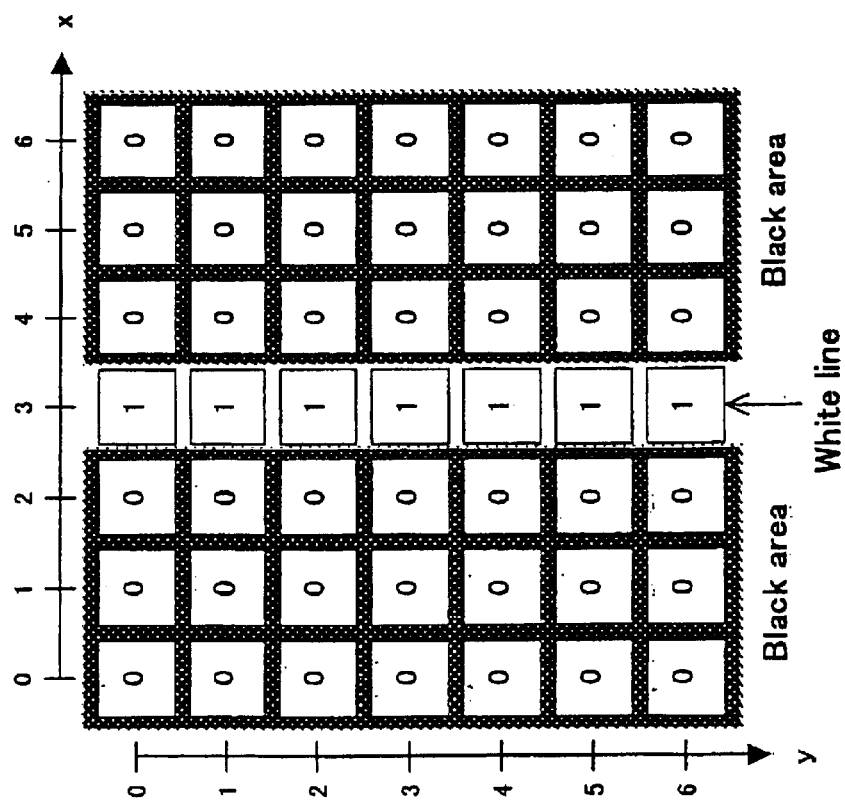

DISPLAY DEVICE AND IMAGE DISPLAYING METHOD

FIELD OF THE INVENTION

The present invention relates to a display device incorporating plural display elements such as LEDs, LCDs or CRTs arranged in matrix. The display elements emit three or more colors including red, green and blue, producing a full color image.

DESCRIPTION OF THE RELATED ART

Display device incorporating a matrix of display elements such as light emitting diodes (LEDs) are widely used as a relatively small-size display or a large stadium-size one. Each of the display elements arranged in matrix emits different colors including red, green, and blue. FIG. 39 is a schematic diagram showing an arrangement of the display elements. Each light device is arranged in a certain pattern. As shown in FIG. 39, blue and red display elements are alternately arranged in line of y=0, and red and green display elements are alternately arrange in line of y=1.

A mixture of the red, green, and blue illumination produced by the respective red, green, and blue display elements can provide a image with full color. For example, to produce white image, each light device is driven so that a total luminance of the red, green, and blue display elements will be equal.

The display devices discussed above can produce a full color image with good reproducibility by a combination of red, green and blue display elements, when a source image have little amount of high-frequency components. When the source image contains high-frequency component, however, the image will be displayed with "false" color.

FIGS. 40A and 40B are schematic diagrams illustrating "false" color caused by high frequency components. FIG. 40A is a schematic diagram showing pixel data representing an image having a thin white line drawn on a black area. In FIG. 40A, the numeral "1" is a value of the pixel data corresponding to the maximum luminance level, and the numeral "0" is a value of the pixel data corresponding to the minimum luminance level. FIG. 40B is a schematic diagram of the display device representing an image corresponding to the pixel data shown in FIG. 40A. In FIG. 40B, each numeral represents a luminance level of each display element, where "1" corresponds to the maximum luminance level. Since the red display elements are provided twice as many as green and blue display elements, each red light device is driven so as to represent half luminance level designated by the pixel data. As shown in FIG. 40B, since the white line is represented by the red and green display elements in the line of x=3, the displayed line image appears yellowish, causing "false" color.

The "false" color discussed above is tend to be produced in an image containing large amount of high-frequency components such as text or graphic image. When an image representing text information is represented with the "false" color, viewers can not recognize it accurately.

It is therefore, a primary object of the invention to provide a display device incorporating matrix of display elements which is capable of providing images without "false" color.

SUMMARY OF THE INVENTION

This object is achieved in accordance with one aspect of the present invention which is a display device having plural display elements arranged in both horizontal and vertical directions comprising a pixel data generator for generating first pixel data consisting of three items of first color element data corresponding to luminance levels of red, green and blue colors, a smoothing filter for performing a smoothing process on said first pixel data thereby producing second pixel data consisting of three items of second color element data corresponding to luminance levels of said respective colors and a driver for driving each of said display elements in accordance with said second color element data.

In another aspect of the present invention is a method for displaying image on a display device having plural display elements arranged in both horizontal and vertical directions comprising generating first pixel data consisting of three items of first color element data corresponding to luminance levels of red, green and blue colors, performing a smoothing process on said first pixel data, thereby producing second pixel data consisting of three items of second color element data corresponding to luminance levels of said respective colors and driving each of said display elements in accordance with said second color element data.

BRIEF DESCRIPTION OF THE DRAWING

FIGS. 4A and 4B are schematic diagrams for a purpose of explaining the operation of the smoothing filter;

FIGS. 5A, 5B and 5C are diagrams each showing an example of smoothing coefficients of the smoothing filters;

FIGS. 6A, 6B and 6C are schematic diagrams showing an operation of the display device according to the first embodiment.

FIG. 7 is a schematic diagram showing a method of producing the second pixel data;

FIGS. 8A, 8B and 8C are diagrams each showing another example of smoothing coefficients of the smoothing filters;

FIG. 9 is a block diagram illustrating a structure of a display device according to the second embodiment;

FIG. 12 is a block diagram illustrating a structure of an high-frequency component circuit;

FIG. 14 is a table showing data stored in the smoothing coefficient generator according to the second embodiment;

FIGS. 31A, 31B, 31C and 31D are schematic diagrams illustrating "false" color being produced, when the pixel data is corrected after a smoothing process;

FIGS. 32A, 32B, 32C and 32D are schematic diagrams showing an operation of the display device according to the seventh embodiment;

FIGS. 40A and 40B are schematic diagrams illustrating "false" color caused by high frequency components.

DETAILED DESCRIPTION OF THE PREFERRED EMBODIMENTS

First Embodiment

Figure 1:
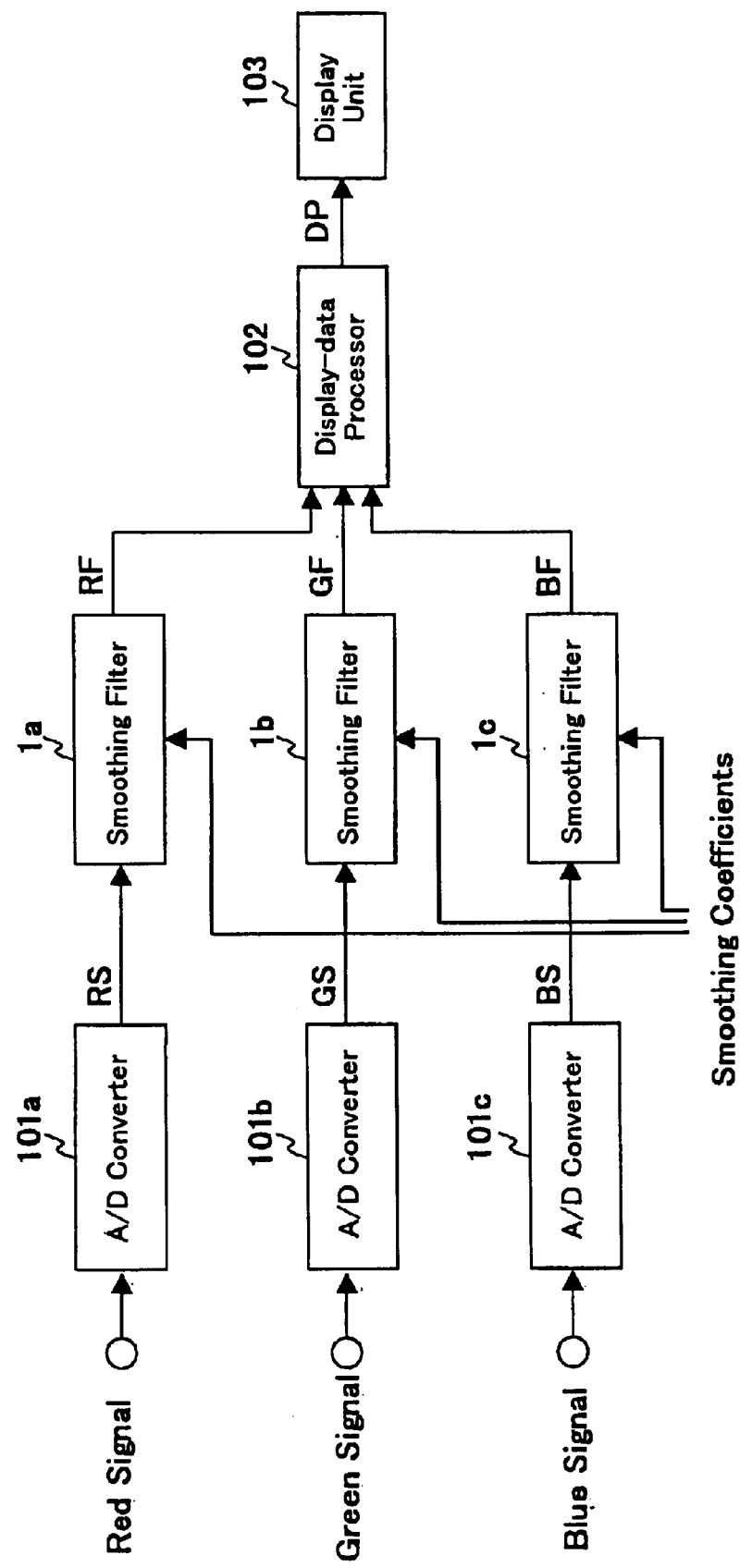
FIG. 1 is a block diagram illustrating a display device according to the first embodiment.

FIG. 1 is a block diagram illustrating a structure of a display device according to the first embodiment of the present invention. The display device according to the first embodiment includes A/D converters $101a$, $101b$ and $101c$, smoothing filters $1a$, $1b$ and $1c$, display-data processor 102 and display unit 103.

Figure 2:
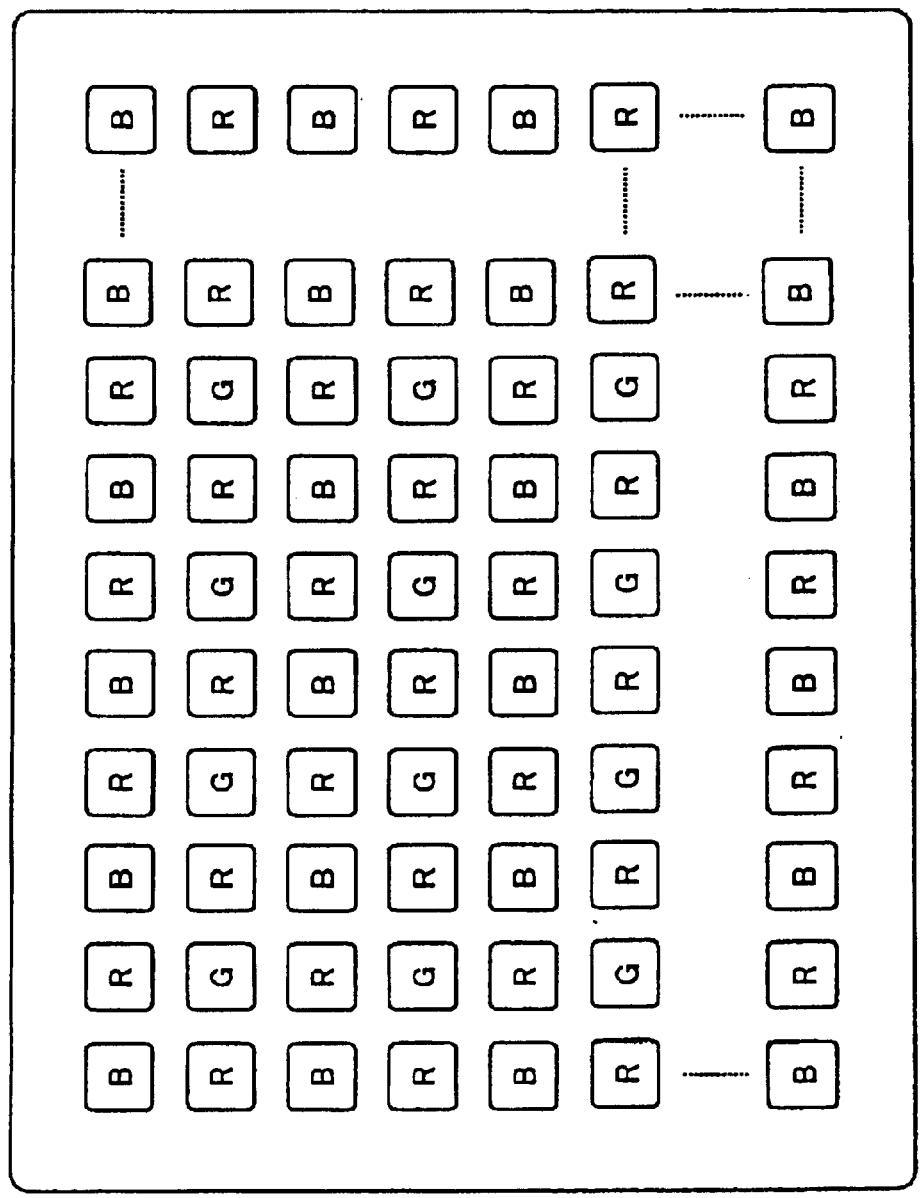
FIG. 2 is a perspective view of a front surface of the display device according to the first embodiment.

FIG. 2 is a perspective view of the front surface of the display unit 103, on which plural display elements, such as LEDs, LCDs, or CRTs, each of which is labeled R, G and B, are arranged in matrix. The display elements labeled as R emit red light, G emit green light, and B emit blue light.

The red, green and blue signals are introduced into the A/D converters $101a$, $101b$ and $101c$, respectively. The A/D converters $101a$, $101b$ and $101c$ take the sampling data of each of the red, green and blue signals with the sampling rate determined by the number of the light device, thereby producing first pixel data consisting of first color element data RS, GS and BS each of which corresponds to red, green and blue luminance levels. The first pixel data is produced for each light device. For example, if there are 200×300 of the display elements arranged in the display unit 103, the first pixel data with a pixel number of 200×300 will be produced. In other words, the first pixel data correspond to luminance level of the display elements. The respective first color element data RS, GS and BS are sent to the smoothing filters $1a$, $1b$ and $1c$.

The smoothing filters $1a$, $1b$ and $1c$ perform smoothing process on the respective first color element data RS, GS and BS, thereby producing second pixel data consisting of second color element data RF, GF and BF. The second color element data RF, GF and BF correspond to the respective red, green and blue luminance levels. The second pixel data represents smoothed image corresponding to the first image formed by the first pixel data. The respective second color element data RF, GF and BF are sent to the display-data processor 102.

The display-data processor 102 produces display-data DP which designates the luminance level of each display element. The display-data processor 102 selects one of the color element data corresponding to the color of each display element, and output it as the display-data DP. For example, the display-data DP corresponding to the display elements labeled "B" in FIG. 2, are produced by selecting the second color element data BF from the second pixel data. The display unit 103 drives each display element with a luminance level designated by the display-data DP. The display unit 103 produce images with broad range of colors by driving each light device with various luminance level.

Figure 3:
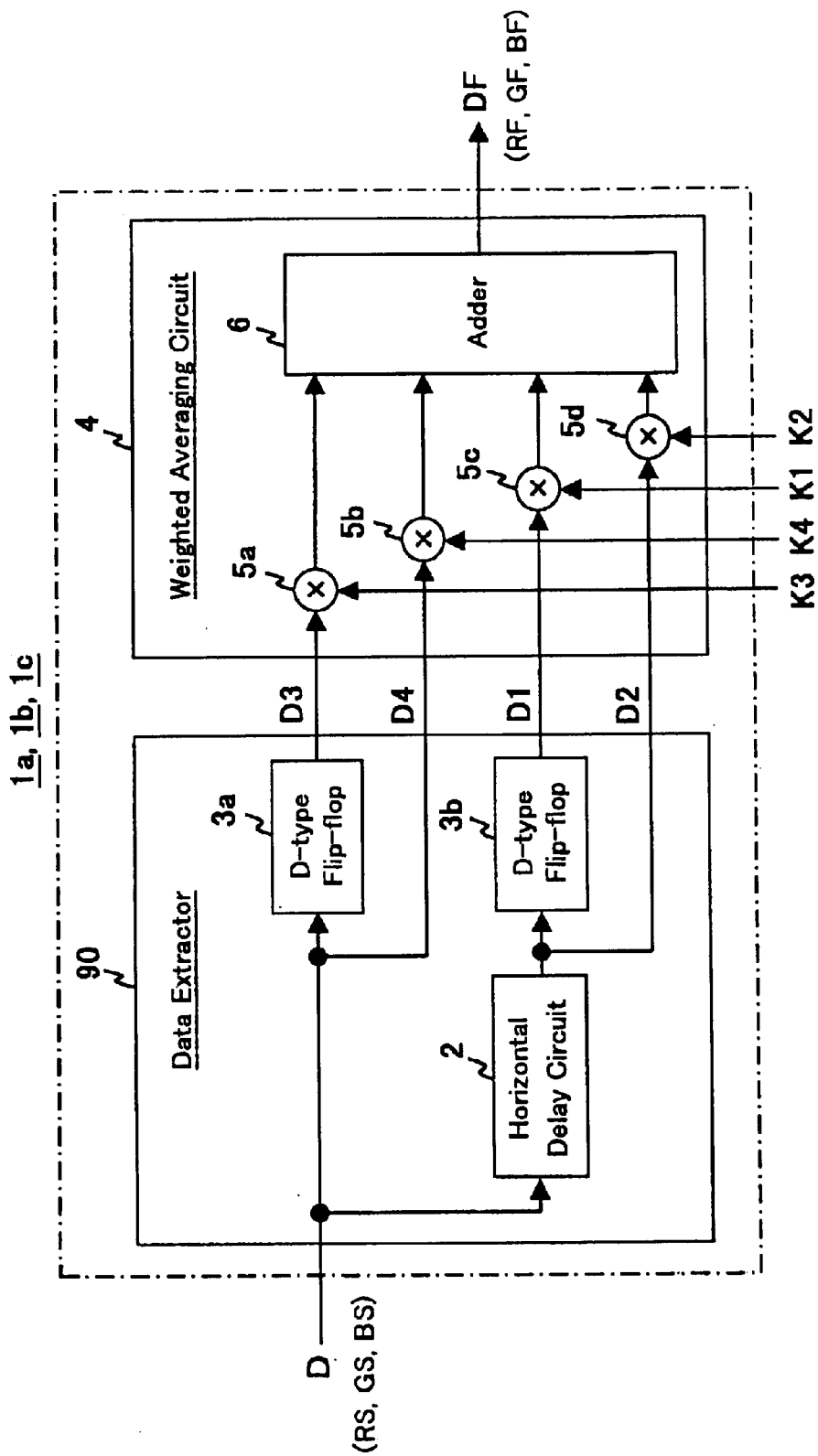
FIG. 3 is a block diagram illustrating a structure of the smoothing filter.

FIG. 3 is a diagram illustrating a structure of the smoothing filters $1a$, $1b$ and $1c$. In FIG. 3, the first color element data RS, GS and BS are indicated "D", hereinafter referred to as pixel data in a following explanation, and the second color element data RF, GF, and BF are indicated "DF". The data extractor 90 extracts pixel data D1, D2, D3 and D4 which forms an area of 2×2 dots shown in FIG. 4A. The horizontal delay circuit 2 delays input pixel data D at one horizontal period and outputs pixel data D2 located above the pixel data D4. The D-type flip-flop $3a$ delays input pixel data D by one dot period and outputs pixel data D3 located next to the pixel data D4. The D-type flip-flop $3b$ delays the output of the horizontal delay circuit 2 by one dot period and outputs pixel data D1 located next to the pixel data D2.

The weighted averaging circuit 4 calculates weighted average value of the pixel data D1, D2, D3 and D4, using smoothing coefficients K1, K2, K3, and K4 as weighting coefficients, and outputs the results as the second color element data DF (RF, GF and BF) corresponding to the pixel data D4. FIG. 4B is a diagram illustrating a correspondence of the smoothing coefficients K1, K2 to K4 to the pixel data D1, D2, D3 and D4.

The multipliers $5c$, $5d$, $5a$ and $5b$ multiply the pixel data D1, D2, D3 and D4 by the smoothing coefficients K1, K2, K3 and K4, respectively. The adder 6 sums up the outputs of the multipliers $5a$, $5b$, $5c$ and $5d$, deriving the weighted average value K1D1+K2D2+K3D3+K4D4, i.e., the second color element data DF.

FIGS. 5A, 5B and 5C are diagrams each showing a specific example of the smoothing coefficients K1, K2, K3 and K4. When smoothing coefficients K1=K2=K3=K4=0.25 (see FIG. 5A) are used, the second color element data become equal to an arithmetic average of the pixel data D1, D2, D3 and D4. When smoothing coefficients K4=1 and K1=K2=K3=0 (see FIG. 5C) are used, the second color element data become equal to the pixel data D4, which means no smoothing process is performed. When smoothing coefficients K2=K3=0.2, K1=0.1 and K4=0.5 (see FIG. 5B) are used, the second color element data become equal to a weighted average of the pixel data D1, D2, D3 and D4 where the pixel data D4 is given the greatest weight. The amount of high-frequency components eliminated with the smoothing filters 1a, 1b and 1c is decreased by giving greater weight to the pixel data D4 than the other pixel data D1, D2 and D3 (as shown in FIG. 5B), and is increased by giving equal weights to the pixel data D1, D2, D3 and D4 (as shown in FIG. 5A).

Figure 6B:
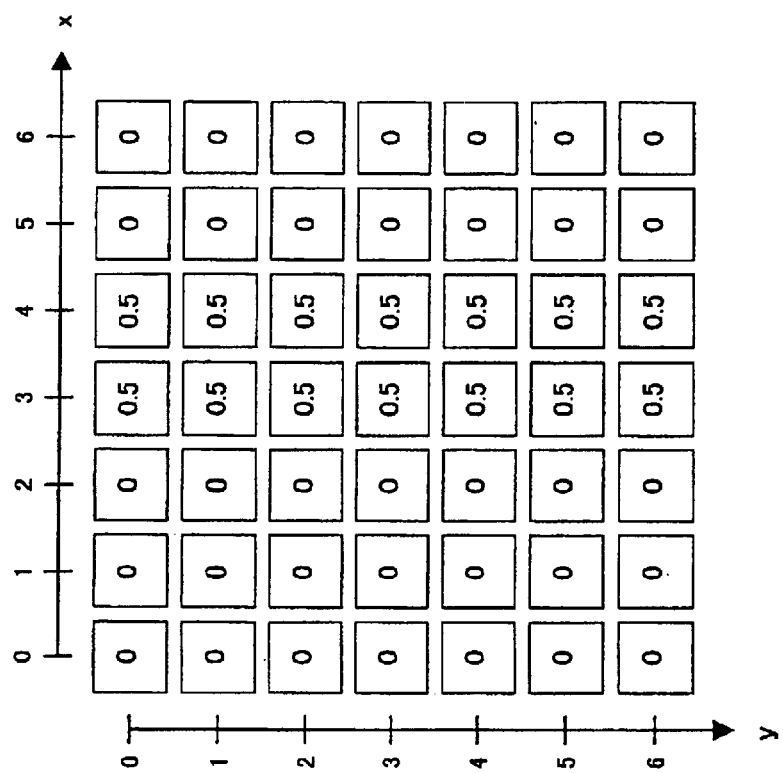
Figure 6A:
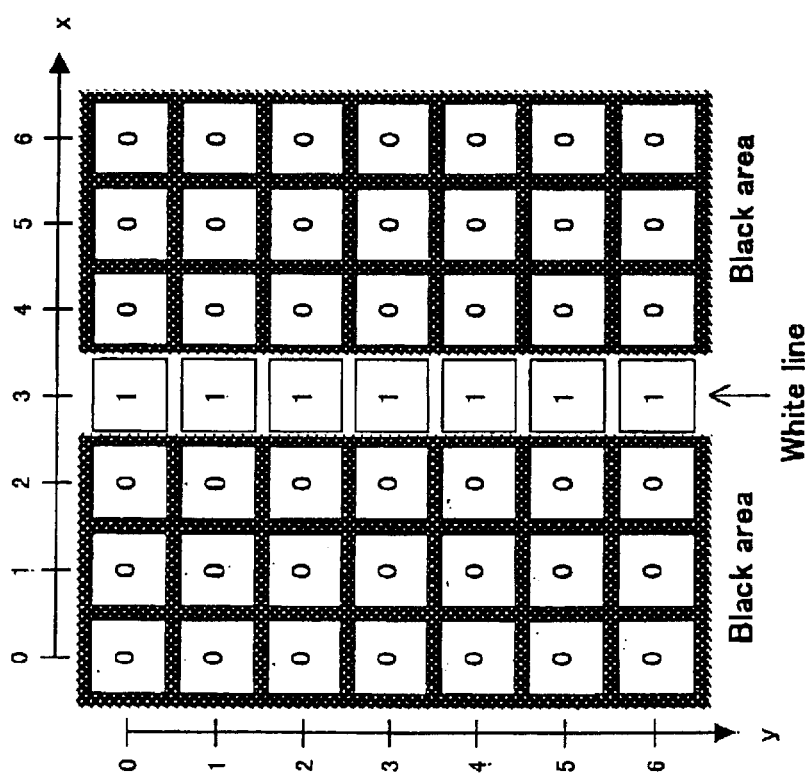

FIGS. 6A, 6B and 6c are schematic diagrams showing an operation of the display device according to this embodiment. FIG. 6A is a schematic diagram showing value of the first pixel data corresponding to the first image having a thin white line drawn in a black area. FIG. 6B is a schematic diagram showing value of the second pixel data obtained by performing the smoothing process on the first pixel data shown in FIG. 6A, using smoothing coefficients K1=K2=K3=K4=0.25 (FIG. 5A). The white line having a width of one dot with level "1", i.e., (RS, GS, BS)=(1, 1, 1), is converted to the white line having a width of two dots with level "0.5", i.e., (RS, GS, BS)=(0.5, 0.5, 0.5). FIG. 6C is a schematic diagram of a second image represented by the display elements of the display unit 103, which is obtained by driving each light device in accordance with the display-data DP. Since the red display elements are provided twice as many as green and blue display elements, each red display element is driven at a half level designated by the second color element data RS=0.5. As shown in FIG. 6C, an emission of the respective red, green, and blue display elements disposed in the area designated "S" become 0.5(=0.25×2), 0.5 and 0.5, which means turn-on display elements in the low of x=3,4 represents "true" white color.

The second color element data can be produced using more number of pixel data forming for example, 3×3 dot area other than 2×2 dot area. FIG. 7 is a schematic diagram showing another method of producing second pixel data, using 3×3 matrix of smoothing coefficients. In this case, second pixel data corresponding to the pixel data "D5" is derived as the weighted average value, i.e., K1D1+K2D2+K3D3+K4D4+K5D5+K6D6+K7D7+K8D8+K9D9, using the smoothing coefficients K1, K2, K3, K4, K5, K6.K7, K8 and K9.

FIGS. 8A, 8B, are 8C is a diagram each showing a specific example of smoothing coefficients K1, K2, K3, K4, K5, K6. K7, K8 and K9.

As shown in FIGS. 5A, 5B and DC, as well as in FIGS. 8A, 8B and 8C, the sum of the smoothing coefficients is equal to 1, so that brightness of a displayed image will be equal to that of original one. On the other hand, when a sum of the smoothing coefficients is set to be larger than 1, the contrast of the display image is enhanced. Conversely, the contrast of the display image is lowered, when the sum of the smoothing coefficients is set to be smaller than 1. Accordingly, the contrast can be adjusted by varying the sum of the smoothing coefficients. Further, the white balance can be adjusted by varying the smoothing coefficients of each of the smoothing filters 1a, 1b and 1c.

The smoothing filters 1a, 1b and 1c described above employ two-dimensional filters which performs the smoothing process on pixel data arranged in both horizontal and vertical directions. One-dimensional filters which performs the smoothing process on pixel data arranged in one direction, horizontal or vertical direction, are also employable as the smoothing filters 1a, 1b and 1c.

Second Embodiment

FIG. 9 is a block diagram illustrating a structure of a display device according to the second embodiment of the present invention. The high-frequency detectors 7a, 7b and 7c produce high-frequency component data RH, GH and BH, each of which indicates the amount of high-frequency components contained in an image. The smoothing coefficient generators 8a, 8b and 8c generate smoothing coefficients KR, KG and KB on the basis of the high-frequency component data RH, GH and BH, and send them to the smoothing filters 1a, 1b and 1c.

Figure 10:
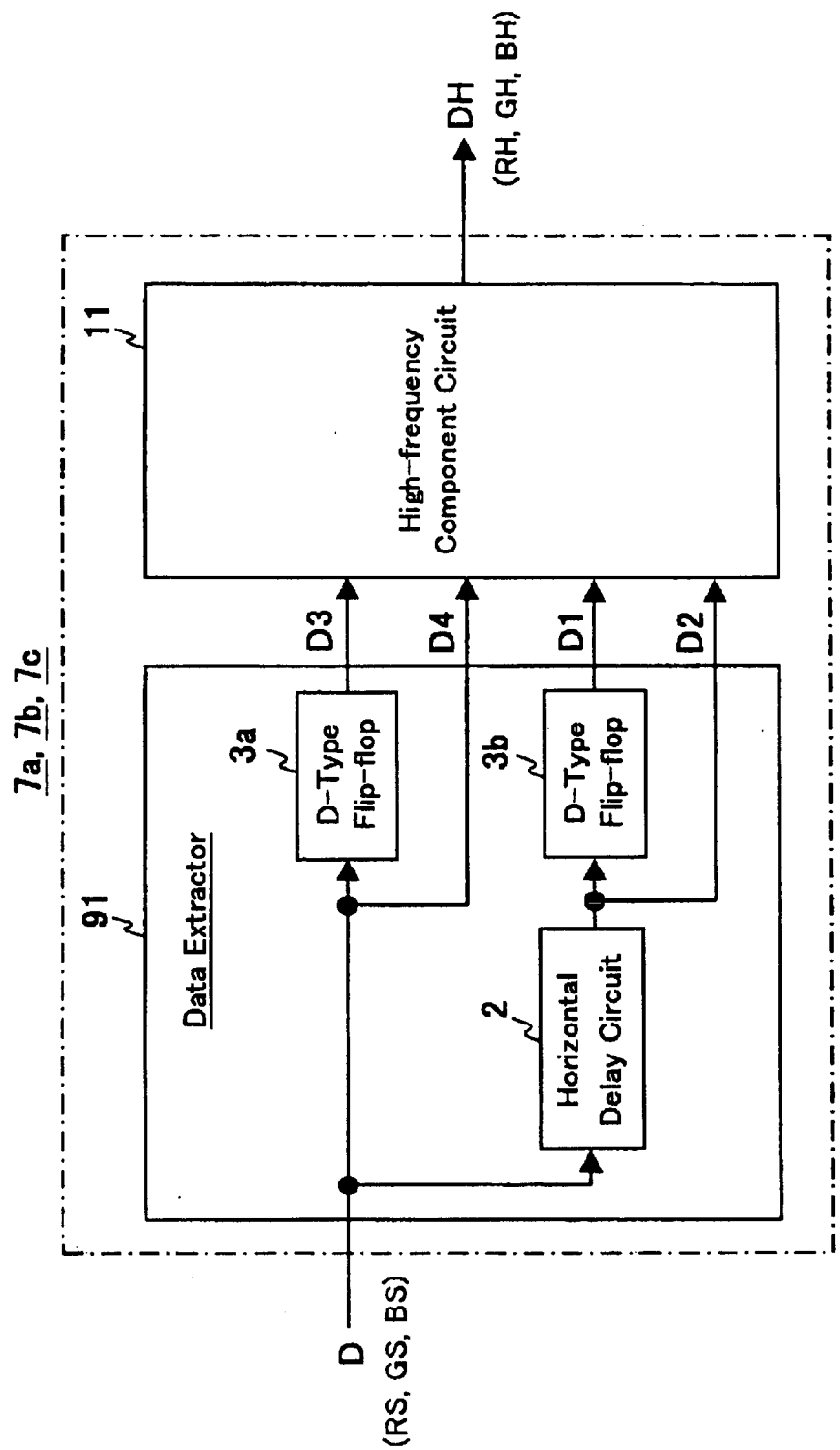
FIG. 10 is a block diagram illustrating a structure of the high-frequency detector according to the second embodiment.
Figure 11:
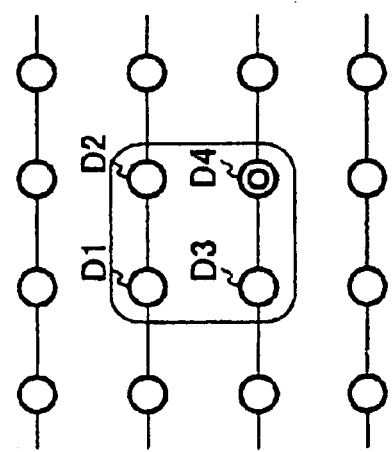
FIG. 11 is schematic diagrams for a purpose of explaining an operation of the high-frequency detector.

FIG. 10 is a diagram illustrating a structure of the high-frequency detector 7a, 7b and 7c. In FIG. 10, the high-frequency component data RH, GH and BH are designated "DH". The data extractor 91 extracts pixel data D1, D2, D3, and D4 forming an area of 2×2 dots shown in FIG. 11. A structure and an operation of the data extractor 91 are the same as the pixel data extractor 90 discussed in the first embodiment (see FIG. 3). The high-frequency component circuit 11 produce high-frequency component data DH on the basis of the pixel data D1, D2, D3 and D4.

FIG. 12 is a diagram illustrating a structure of the high-frequency component circuit 11. The subtracters 12a, 12b, and 12c subtract a value of each of the pixel data D1, D2 and D3 from that of D4. The absolute value circuits 13a, 13b and 13c produce an absolute value of an output of each of the subtracters 12a, 12b and 12c, i.e., |D4−D1|, |D4−D2|, and |D4−D3|. The maximum selector 14 selects one of an output of the absolute value circuits 13a, 13b and 13c having maximum value as the high-frequency component data DH. Each of the high-frequency component data RH, GH and BH (the equivalent of DH) is sent to the smoothing coefficient generators 8a, 8b and 8c, respectively.

Figure 13:
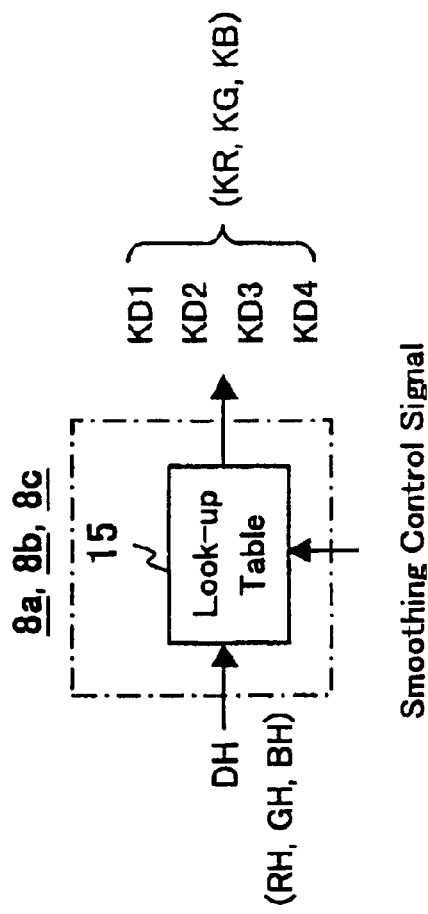
FIG. 13 is a diagram illustrating a structure of a smoothing coefficient generator according to the second embodiment.

FIG. 13 is a diagram illustrating a structure of the smoothing coefficient generators 8a, 8b and 8c. The look-up table 15 outputs the smoothing coefficients KD1, KD2, KD3 and KD4, indicated "KR", "KG" and "KB" in FIG. 9, according to a value of the high-frequency data DH. Each of the smoothing coefficients KD1, KD2, KD3 and KD4 corresponds to the smoothing coefficients K1, K2, K3 and K4,shown in FIG. 4B. FIG. 14 is a table showing data stored in the look-up table 15. The look-up table 15 stores look-up data, KD1(n), KD2(n), KD3(n) and KD4(n) (n=0,1,2 . . . 255), each of which represents a value of the smoothing coefficients KD1, KD2, KD3 and KD4 for each value of the high-frequency component data from 0/255 to 255/255. The value of the high-frequency component data DH designates an address where corresponding smoothing coefficients are stored. For example, smoothing coefficients corresponding to the high-frequency component data DH=0/255 are stored in an area of address "0". The look-up table 15 accordingly reads out data stored in the address "0", i.e., KD1(0), KD2(0), KD3(0) and KD4(0). The data stored in the look-up table 15 are rewritten in response to the smoothing control signal supplied from the outside, allowing to change characteristic of the smoothing coefficients.

Figure 15:
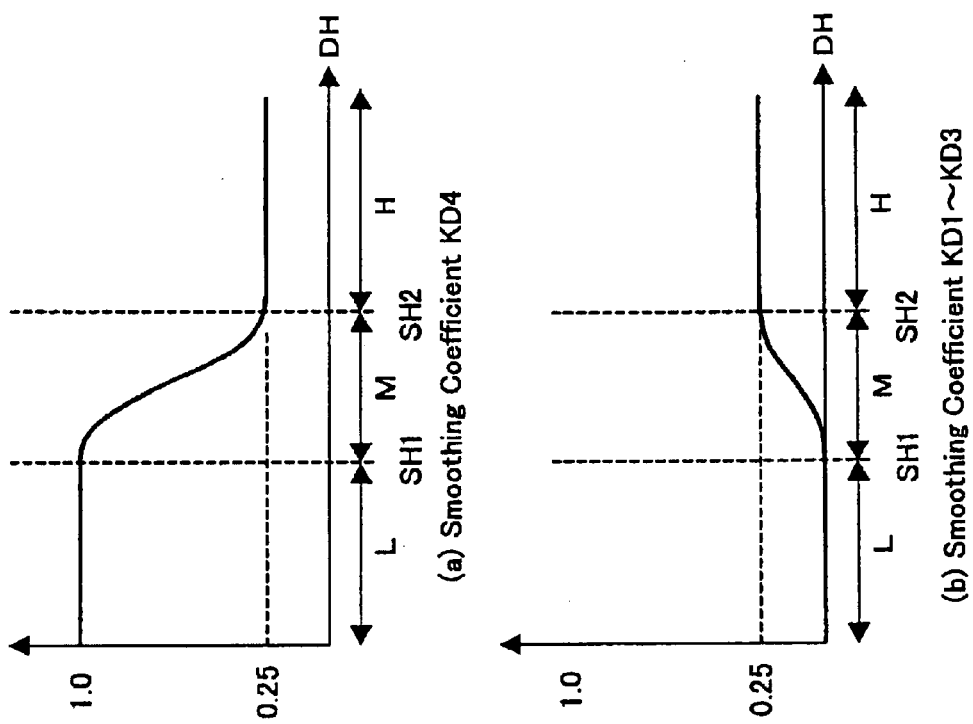
FIG. 15 is a diagram showing a characteristic of the smoothing coefficients generated by the smoothing coefficient generator according to the second embodiment.

FIG. 15 is a diagrams showing characteristics of (a)the smoothing coefficient KD4, and (b)the characteristic of the smoothing coefficients KD1, KD2 and KD3. In FIG. 15, SH1 and SH2 are parameters dividing a range of the high-frequency data DH into three regions, L, M and H. In the region L where DH<SH1, the smoothing coefficients become KD1=KD2=KD3=0 and KD4=1 (see FIG. 5C), in the region H where DH>SH2, the smoothing coefficients become KD1=KD2=KD3=KD4=0.25(see FIG. 5A), and in the region M where SH1≦DH<SH2, the smoothing coefficients become 0.25<KD4<1, K1=K2=K3=(1−K4)/3 (see FIG. 5B, for example). This means no smoothing process is performed in an area with little amount of high-frequency components. In other words, smoothing process is performed only in the area having large amount of the high-frequency components. Furthermore, the smoothing coefficients are varied in accordance with a value of the high-frequency component data DH, thereby preventing an image becoming blurry by unnecessary smoothing process.

Third Embodiment

The look-up table 15 employed in the smoothing coefficient generators 8a, 8b and 8c discussed in the second embodiment(see FIG. 13) requires a memory large enough to hold all data designating the smoothing coefficients. This embodiment presents smoothing coefficient generators which produce smoothing coefficients by calculations.

Figure 16:
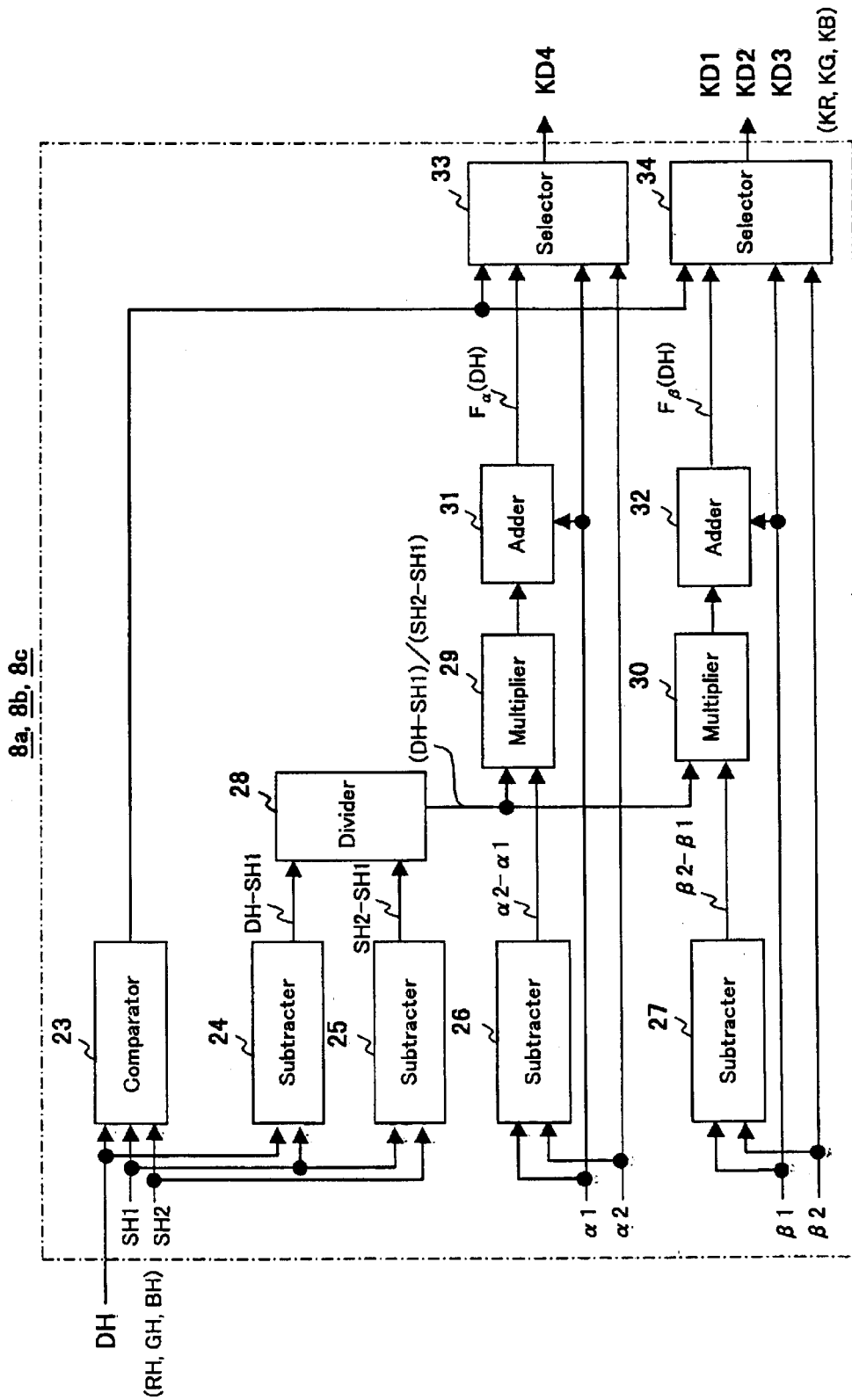
FIG. 16 is a block diagram illustrating a structure of a smoothing coefficient generator according to the third embodiment.
Figure 17:
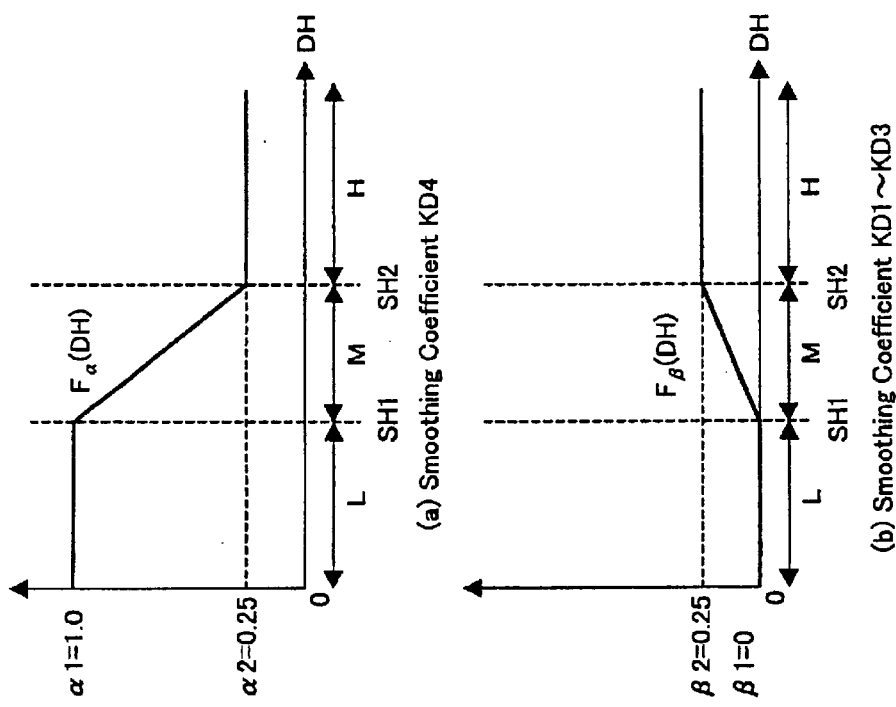
FIG. 17 is a diagram showing a characteristic of the smoothing coefficients produced by a smoothing coefficient generator shown in FIG. 16.

FIG. 16 is a block diagram illustrating a structure of the smoothing coefficient generators 8a, 8b and 8c according to the third embodiment. FIG. 17 is a diagram showing characteristics of (a)the smoothing coefficient KD4, and (b)the smoothing coefficients KD1, KD2 and KD3, produced by the smoothing coefficient generator shown in FIG. 16. α1 and α2 are parameters which define a value of the smoothing coefficient KD4. β1 and β2 are parameters which define value of the smoothing coefficients KD1, KD2 and KD3. In this embodiment, the respective parameters are set as follows, α1=1, α2=0.25, β1=0, β2=0.25. SH1 and SH2 are parameters dividing a range of the high-frequency component data DH into three regions L, M and H. These parameters are given to the smoothing coefficient generators 8a, 8b and 8c through the soothing control signal supplied from the outside(see FIG. 9).

As shown in FIG. 17, in the region L where DH<SH1, the smoothing coefficients become KD1=KD2=KD3=β1(=0) and KD4=α1(=1) (see FIG. 5C). In the region H where SH2≦DH, the smoothing coefficients become K1D=KD2=K3=β2(=0.25) and K4=α2(=0.25) (see FIG. 5A). In the region M where SH1≦DH<SH2, the smoothing coefficients KD1, KD2 and KD3, and D4 are given by following functions Fβ(DH) and Fα(DH), respectively:

$$F_\alpha(DH) = \frac{\alpha 2 - \alpha 1}{SH2 - SH1}(DH - SH1) + \alpha 1 \quad (1)$$

$$F_\beta(DH) = \frac{\beta 2 - \beta 1}{SH2 - SH1}(DH - SH1) + \beta 1 \quad (2)$$

According to these functions, Fα(DH) and Fβ(DH), in the region M, the smoothing coefficients are varied in accordance with a value of the high-frequency component data DH. The functions Fα(DH) and Fβ(DH), for example, produce following smoothing coefficients: KD1=KD2=KD3=0.5/3, KD4=0.5.

An operation of the smoothing coefficient generator shown in FIG. 16 is discussed below.

The comparator 23 compares a value of the high-frequency component data DH with the parameters SH1 and SH2, and produces a signal which indicates L when DH<SH1, M when SH1≦DH<SH2, and H when SH2≦DH. The signal produced by the comparator 23 is sent to the selector 33 and 34.

The subtracter 24 subtracts the parameter SH1 from the high-frequency component data DH, and the subtracter 25 subtracts SH1 from the parameter SH2. The divider 28 divides an output of the subtracter 24 by an output of the subtracter 25, and outputs the result, (DH−SH1)/(SH2−SH1), to the multipliers 29 and 30. The subtracter 26 subtracts the parameter α1 from α2, and outputs the result to the multiplier 29. The subtracter 27 subtracts the parameter β1 from β2, and outputs the result to the multiplier 30.

The multiplier 29 multiplies an output of the subtracter 26 by an output of the divider 28, and outputs the result, (DH−SH1)(α2−α1)/(SH2−SH1), to the adder 31. The adder 31 adds the parameter α1 to an output of the multiplier 29, thereby obtaining the function Fα(DH). The function Fα(DH) and parameters α1 and α2 are sent to the selector 33.

The multiplier 30 multiplies an output of the subtracter 27 by the output of the divider 28, and outputs the result, (DH−SH1)(β2−β1)/(SH2−SH1), to the adder 32. The adder 32 adds the parameter β1 to the output of the multiplier 30, thereby obtaining the function Fβ(DH). The function Fβ(DH) and the parameter β1 and β2 are sent to the selector 34.

The selector 33 produces the smoothing coefficient KD4 by selecting one of the inputs, α1, α2 or Fα(DH) according to the signal indicating the region L, M and H which is produced by the comparator 23. Similarly, the selector 34 produces the smoothing coefficients KD1, KD2 and KD3 by selecting one of the inputs, β1, β2 or Fβ(DH) according to the signal produced by the comparator 23. When the signal indicates L, which means DH<SH1, the selector 33 selects the parameter α1=1 as the smoothing coefficient KD4, and the selector 34 selects the parameter β1=0 as the smoothing coefficient KD1, KD2 and KD3. When the signal indicates M, which means SH1≦DH<SH2, the selector 33 selects FA(DH) as the smoothing coefficient KD4, and the selector 34 selects FP(DH) as the smoothing coefficients KD1, KD2 and KD3. When the signal indicates H, which means SH2≦DH, the selector 33 selects α2=0.25 as the smoothing coefficient KD4, and the selector 34 selects β2=0.25 as the smoothing coefficients KD1, KD2 and KD3.

As a result of the operation discussed above, the smoothing coefficients KD1, KD2, KD3 and KD4 having the characteristic shown in FIG. 17 are produced.

Figure 18:
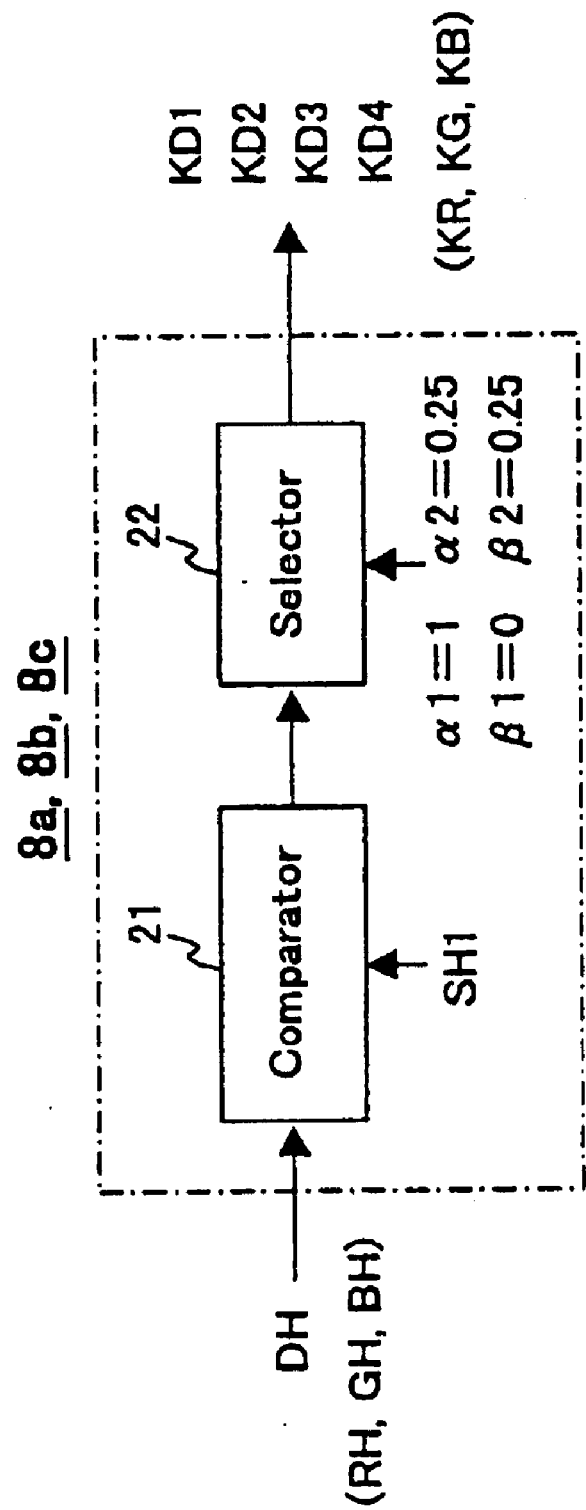
FIG. 18 is a block diagram illustrating a structure of the smoothing coefficient generator according to the third embodiment.
Figure 19:
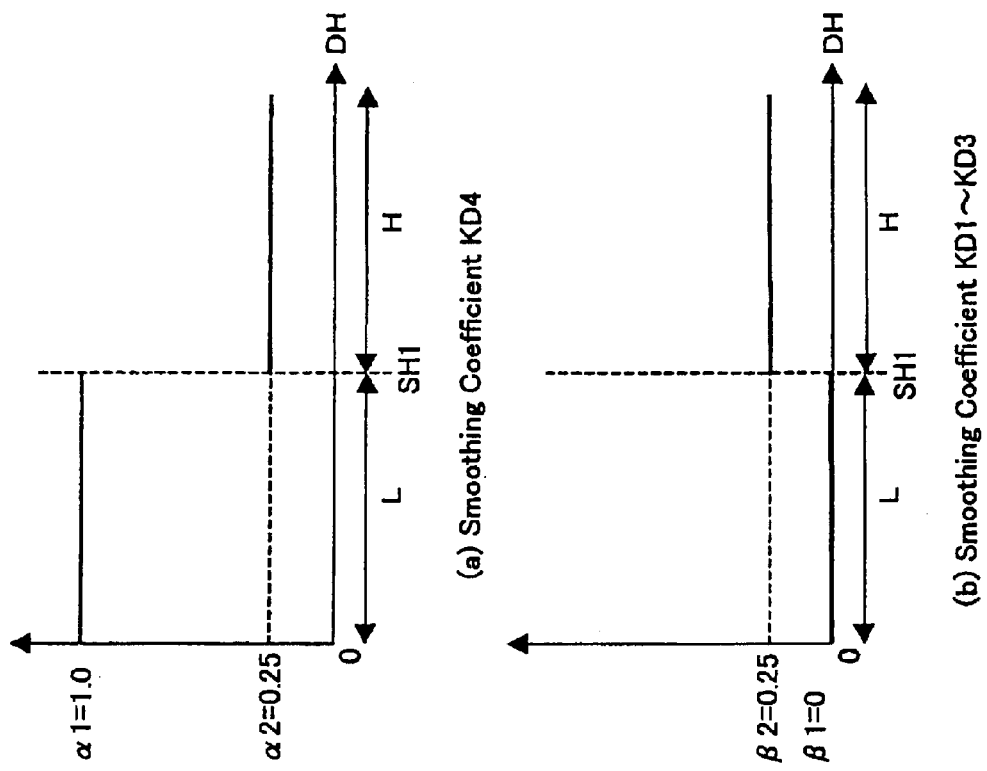
FIG. 19 is a diagram showing a characteristic of the smoothing coefficients produced by a smoothing coefficient generator shown in FIG. 18.

FIG. 18 is a diagram illustrating alternative structure of the smoothing coefficient generators 8a, 8b and 8c according to this embodiment. FIG. 19 is a diagram showing characteristics of (a)the smoothing coefficient KD4, and (b)the smoothing coefficients KD1, KD2 and KD3, produced by the smoothing coefficient generators shown in FIG. 15.

An operation of the smoothing coefficient generator shown in FIG. 18 is discussed below.

The comparator 21 compares a value of the high-frequency component data DH with the parameter SH1, and produce a signal which indicates L when DH<SH1, M when SH1≦DH<SH2, and H when SH2≦DH. The selector 22 outputs the smoothing coefficients KD1, KD2, KD3 and KD4 by selecting the parameters, α1, β1, α2 and β1, according to the signal produced by the comparator 21. When the signal indicates L, which means DH<SH1, the selector 22 selects the parameter α1=1.0 as the smoothing coefficient KD4, and selects β1=0 as the smoothing coefficient KD1, KD2 and KD3. When the signal indicates H, which means SH2≦DH, the selector 22 selects the parameter α2=0.25 as the smoothing coefficient KD4, and selects β2=0.25 as the smoothing coefficients KD1, KD2 and KD3. As a result of the operation discussed above, the smoothing coefficients KD1, KD2, KD3 and KD4 having the characteristic shown in FIG. 19 are produced.

Fourth Embodiment

Figure 20:
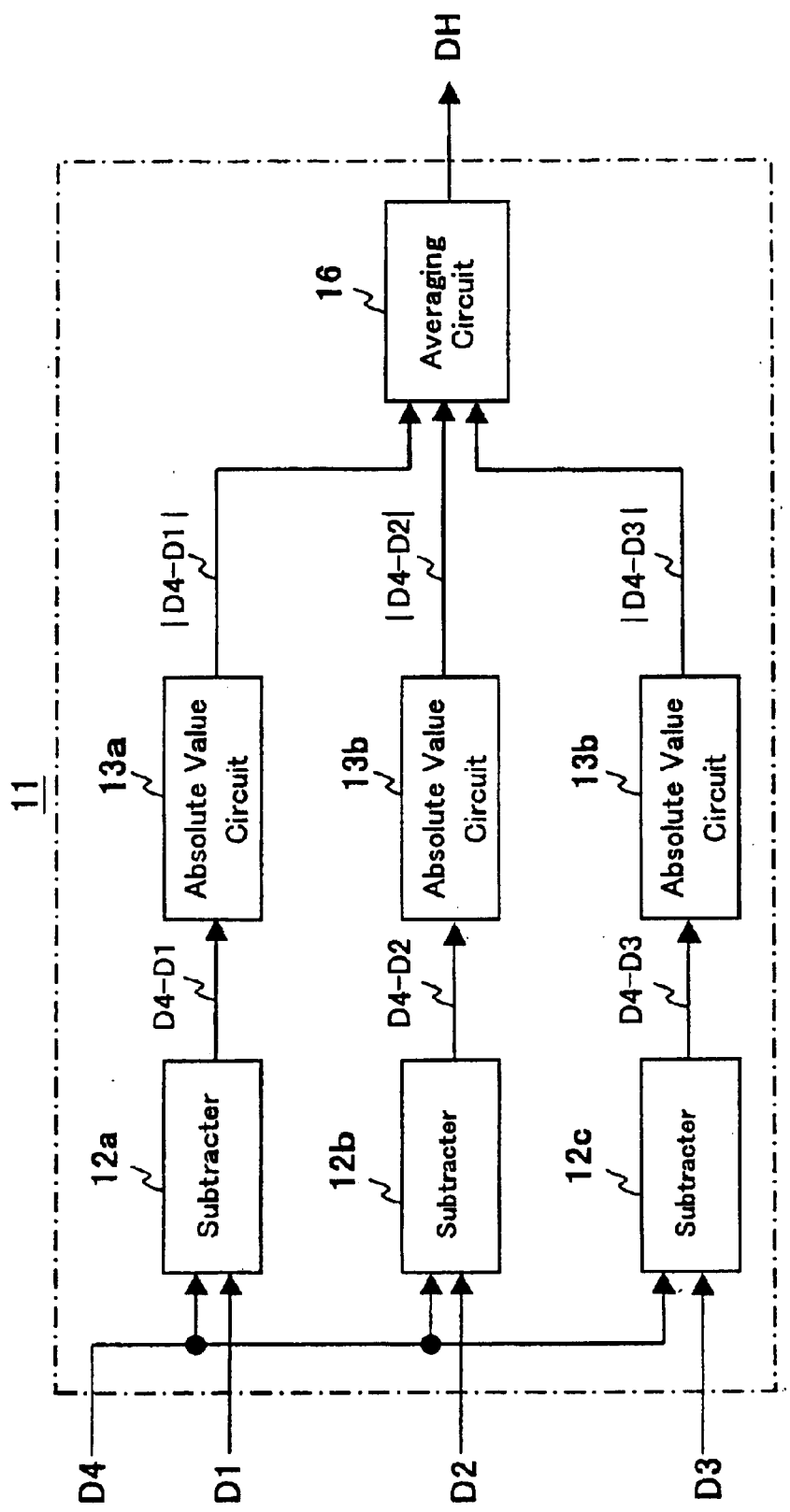
FIGS. 20, 21 and 22 are block diagrams each illustrating a structure of the high-frequency component circuit according to the fourth embodiment.

FIG. 20 is a block diagram illustrating a structure of the high-frequency component circuit 11 according to the fourth embodiment. The averaging circuit 16 averages outputs of the absolute value circuits 13a, 13b and 13c, and outputs the average value, i.e., {|D4−D1|+|D4−D2|+|D4−D3|}/3, as the high-frequency component data DH. By averaging |D4−D1|, |D4−D2| and |D4−D3|, the difference between two pixel data D4 and each of D1, D2 and D3, the error component included in the high-frequency can be reduced.

Figure 21:
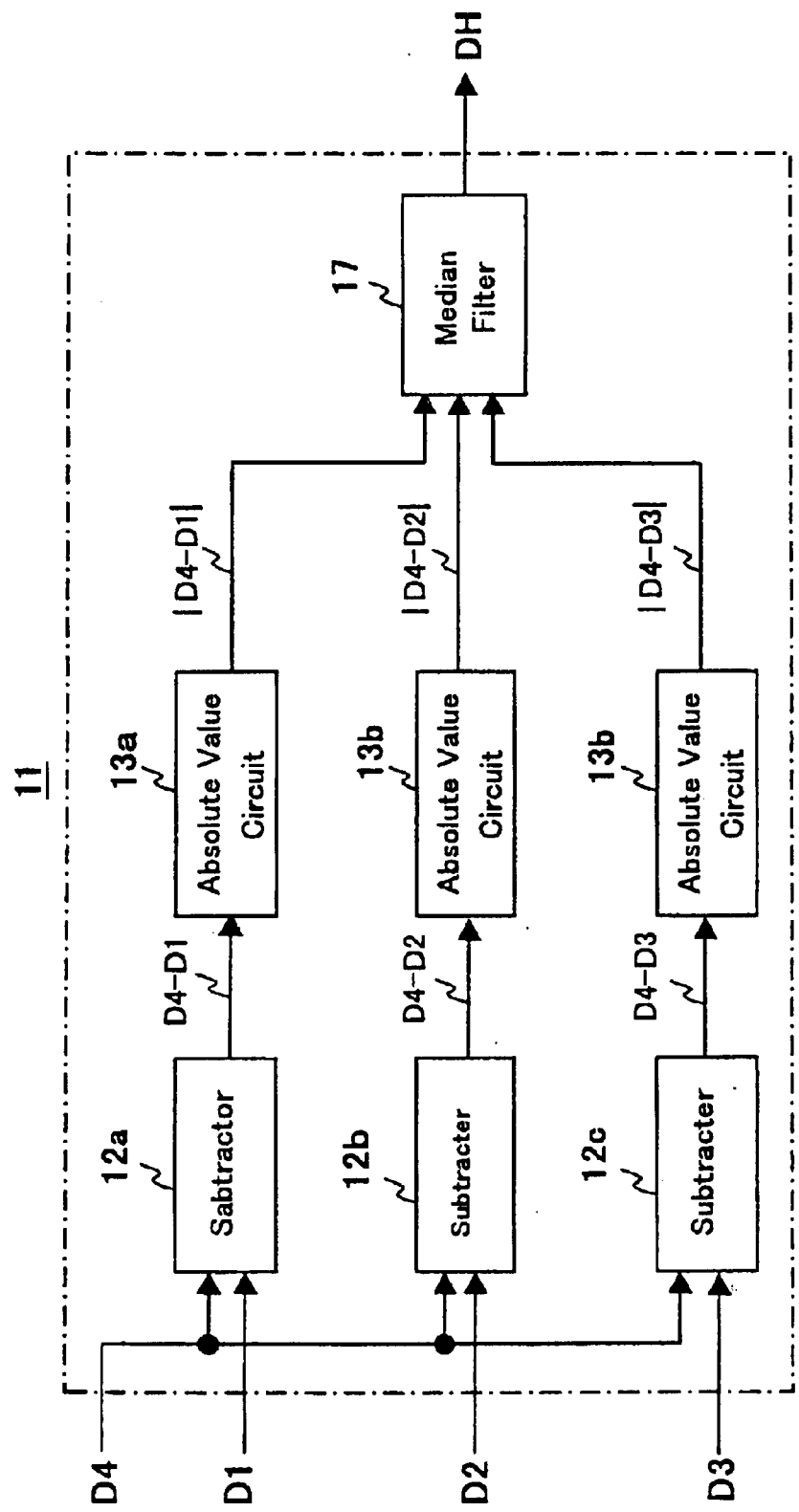

FIG. 21 is a block diagram illustrating alternative structure of the high-frequency component circuit 11. The median filter 17 selects one of the outputs of the absolute value circuits 13a, 13b and 13c having middle value. The selected value, |D4−D1|, |D4−D2| or |D4−D3|, is outputted as the high-frequency component data DH.

Figure 22:
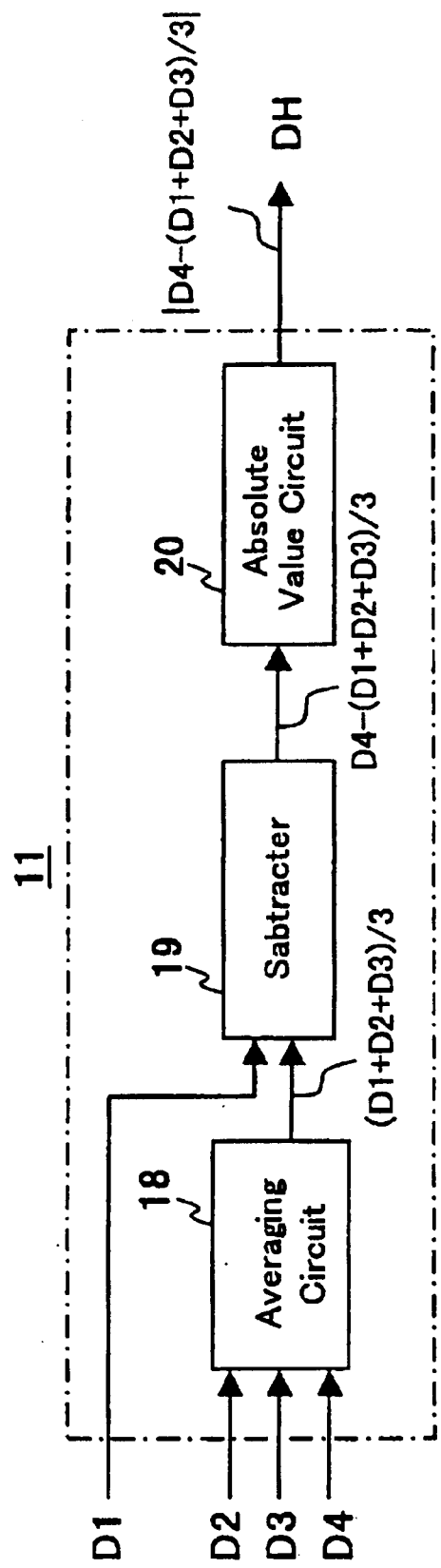

FIG. 22 is a block diagram illustrating alternative structure of the high-frequency component circuit 11. The averaging circuit 18 calculates average value of three pixel data D2, D3 and D4, and sends the result, (D1+D2+D3)/3, to the subtracter 19. The subtracter 19 outputs the difference between two inputs, (D1+D2+D3)/3 and D4. The absolute value circuit 20 take an absolute value of an output of the subtracter 19, and output the absolute value i.e., |D4−(D1+D2+D3)/3|, as the high-frequency component data DH.

Fifth Embodiment

Figure 23:
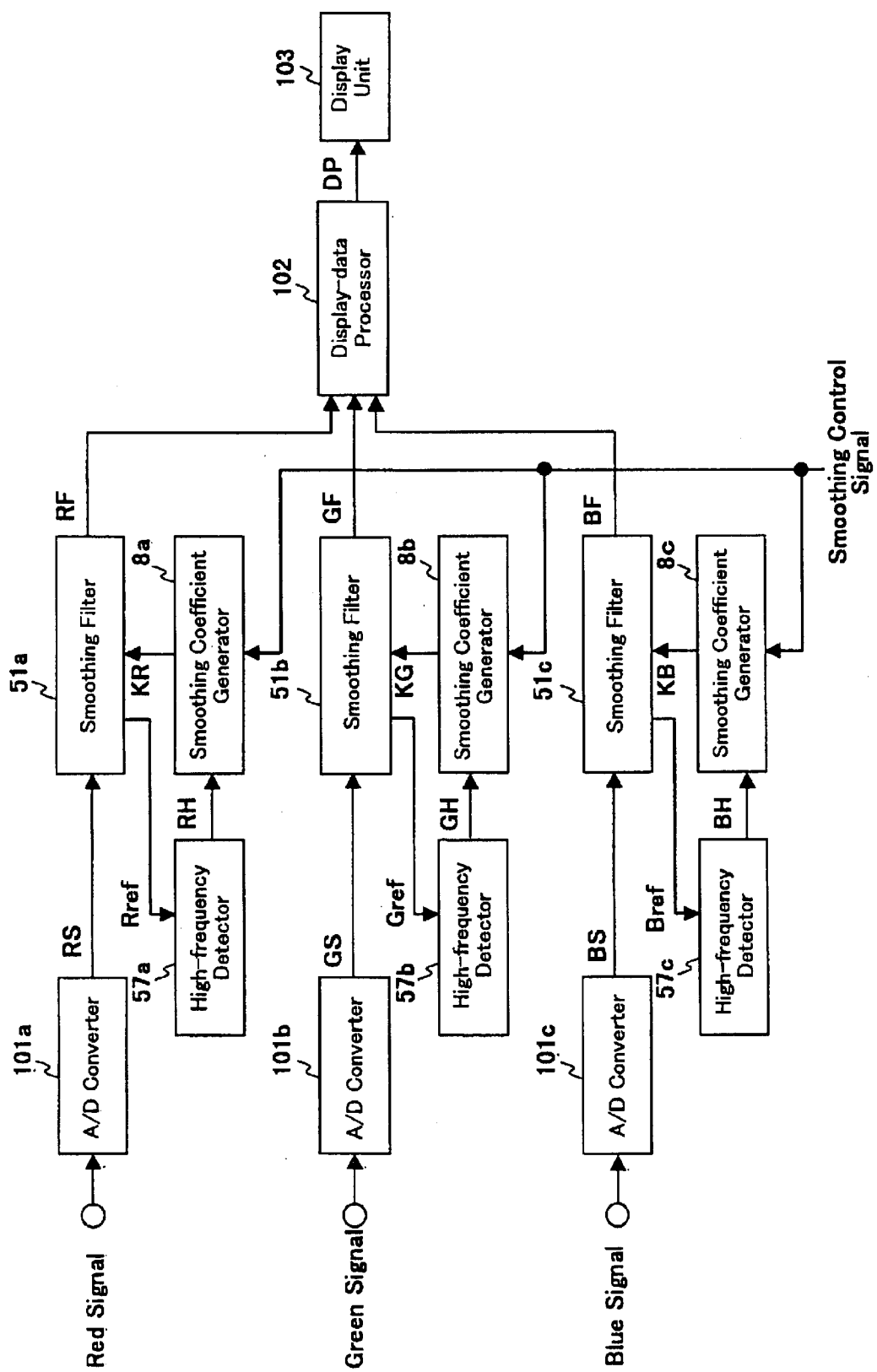
FIG. 23 is a block diagram illustrating a structure of a display device according to the fifth embodiment.

FIG. 23 is a block diagram illustrating a structure of a display device according to the fifth embodiment of the present invention. The smoothing filters 51a, 51b and 51c provide the high-frequency detectors 57a, 57b and 57c with the pixel data Rref, Gref and Bref, respectively, each of which is the equivalence of the pixel data D1, D4, D3 and D4.

Figure 24:
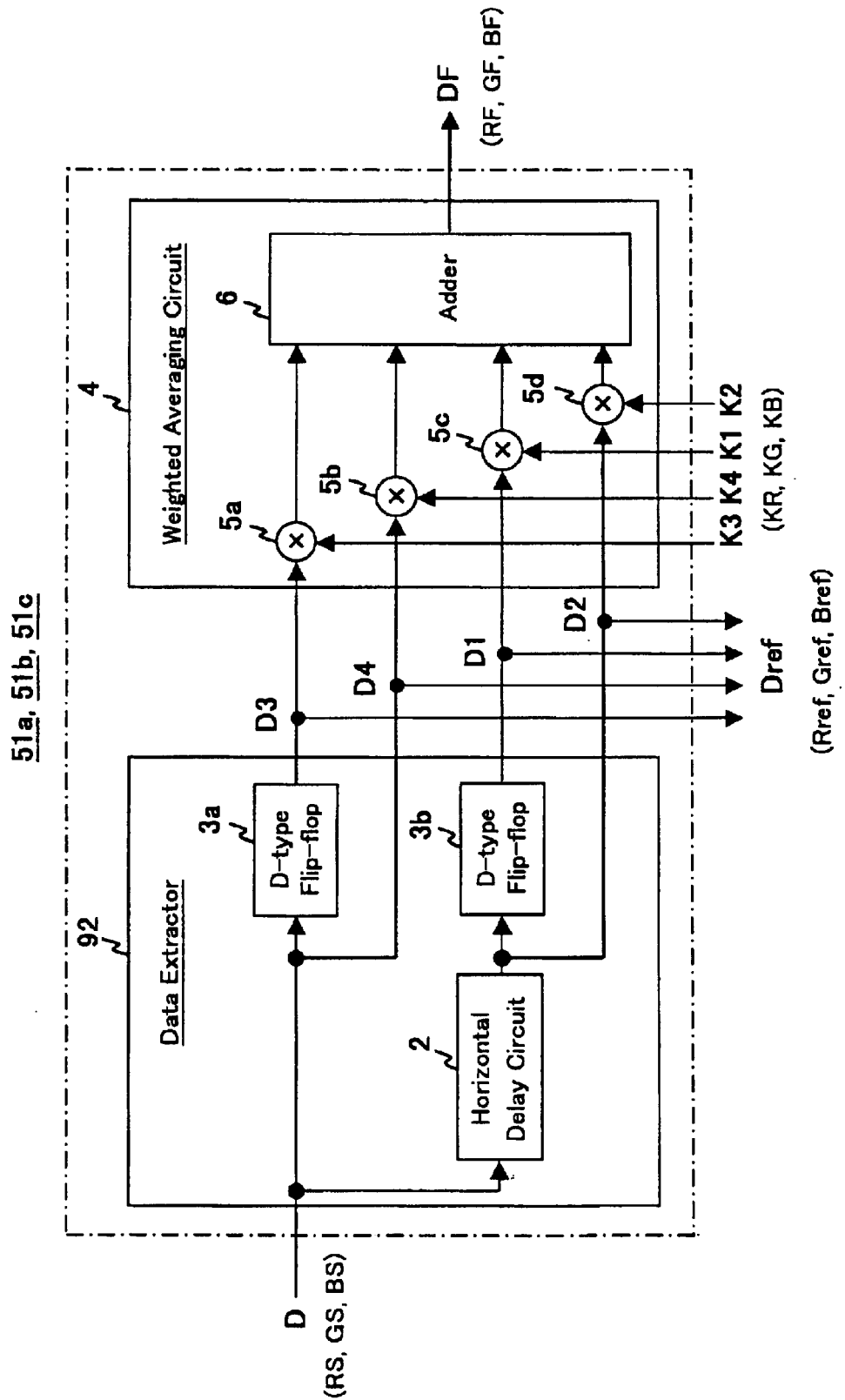
FIG. 24 is a block diagram illustrating a structure of a smoothing filter according to the fifth embodiment.
Figure 25:
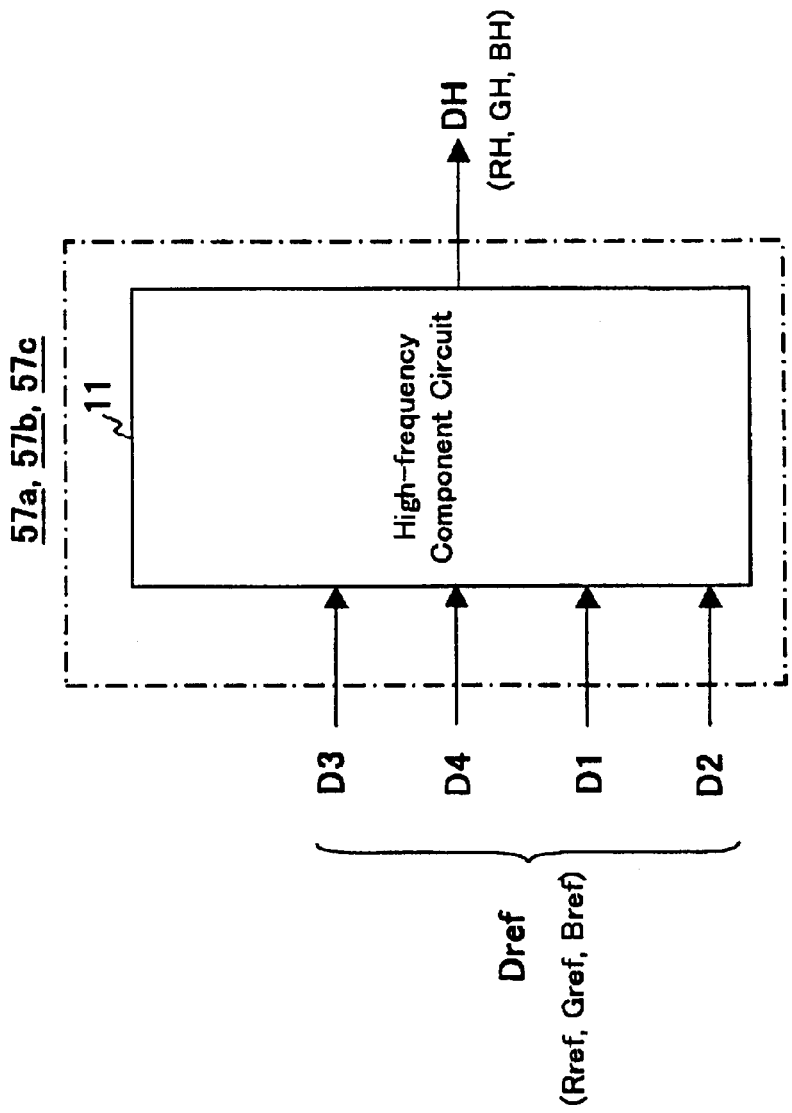
FIG. 25 is a diagram illustrating a structure of a high-frequency detector according to the fifth embodiment.

FIG. 24 is a block diagram illustrating a structure of the smoothing filters 51a, 51b and 51c. The pixel data D1, D2, D3 and D4 extracted by the data extractor 92 are sent to the weighted-averaging circuit 4. The pixel data D1, D2, D3 and D4, indicated Rref, Gref and Bref, are also sent to the high-frequency component circuit 11 incorporated in the high-frequency detectors 57a, 57b and 57c. FIG. 25 is a diagram illustrating a structure of the high-frequency detectors 57a, 57b and 57c. By sending the pixel data D1, D2, D3 and D4 extracted by the data extractor 92 incorporated in the high-frequency component circuit 11 to the smoothing filters 51a, 51b and 51c, the data extractor 91 incorporated in the high-frequency detector 7a, 7b and 7c (see FIG. 10) can be omitted.

Sixth Embodiment

Figure 26:
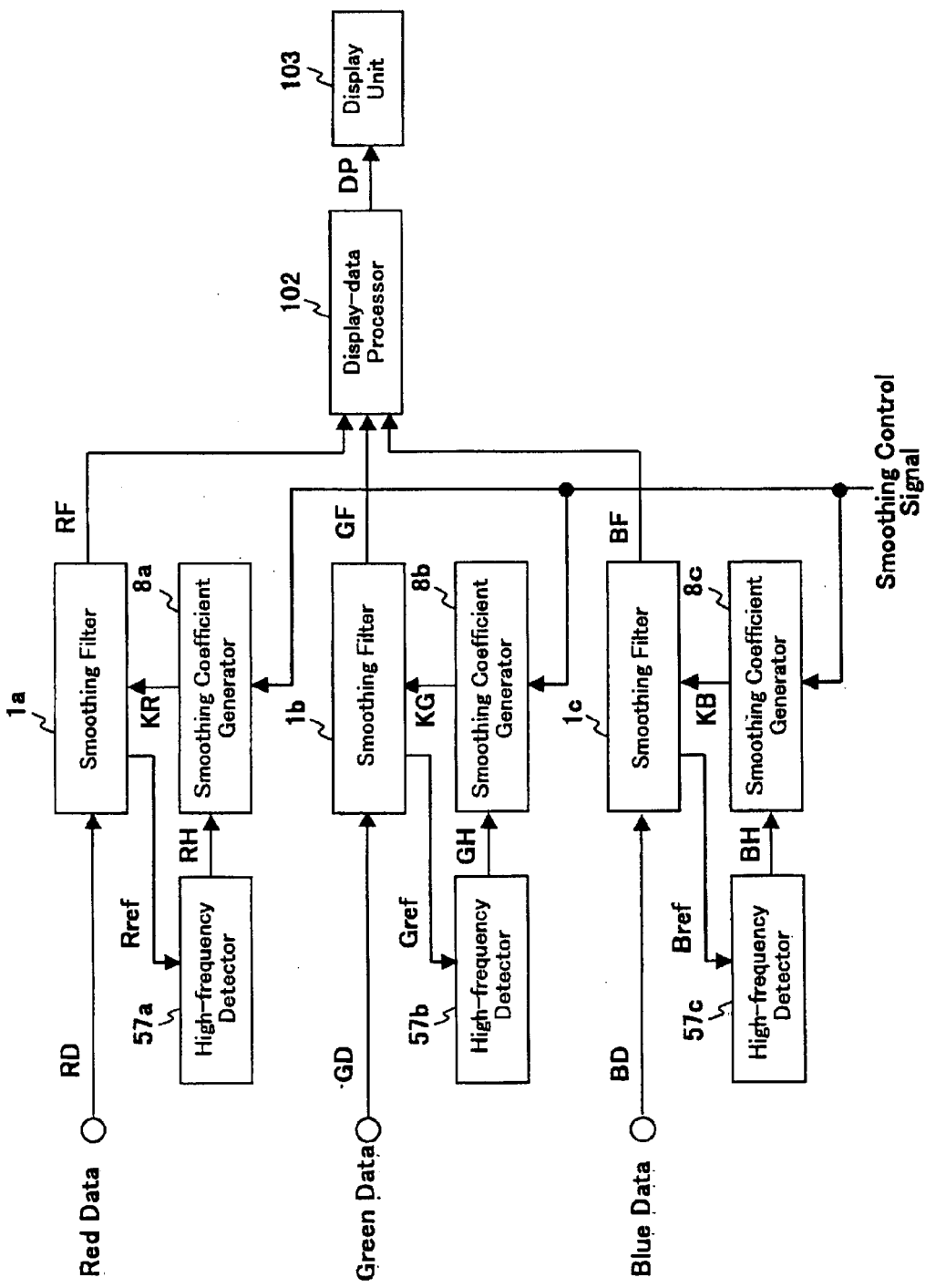
FIG. 26 is a block diagram illustrating a structure of a display device according to the sixth embodiment.

FIG. 26 is a diagram illustrating a structure of a display device according to the sixth embodiment. The red, green and blue data RD, GD and BD are the digital-type signals in the form of the sampling data. When the input signals are in the form of the sampling data, it can be regarded as the first pixel data discussed in the first embodiment. In this case, the input signals may be directly introduced to the smoothing filters 1a, 1b and 1c, as shown in FIG. 26. The digital-type signals of this kind can be obtained by a digital interface unit which receives either digital or analog TV signals.

Each of the smoothing filters 1a, 1b and 1c shown in FIG. 26 performs smoothing process on the respective first color element data RD, GD and BD, thereby producing the second color element data RF, GF and BF. The display-data processor 102 selects one of the second color element data RF, GF or BF as a display-data DP for each of the display elements. The display unit 103 drives each display element with a luminance level designated by the display-data DP.

Seventh Embodiment

Figure 27:
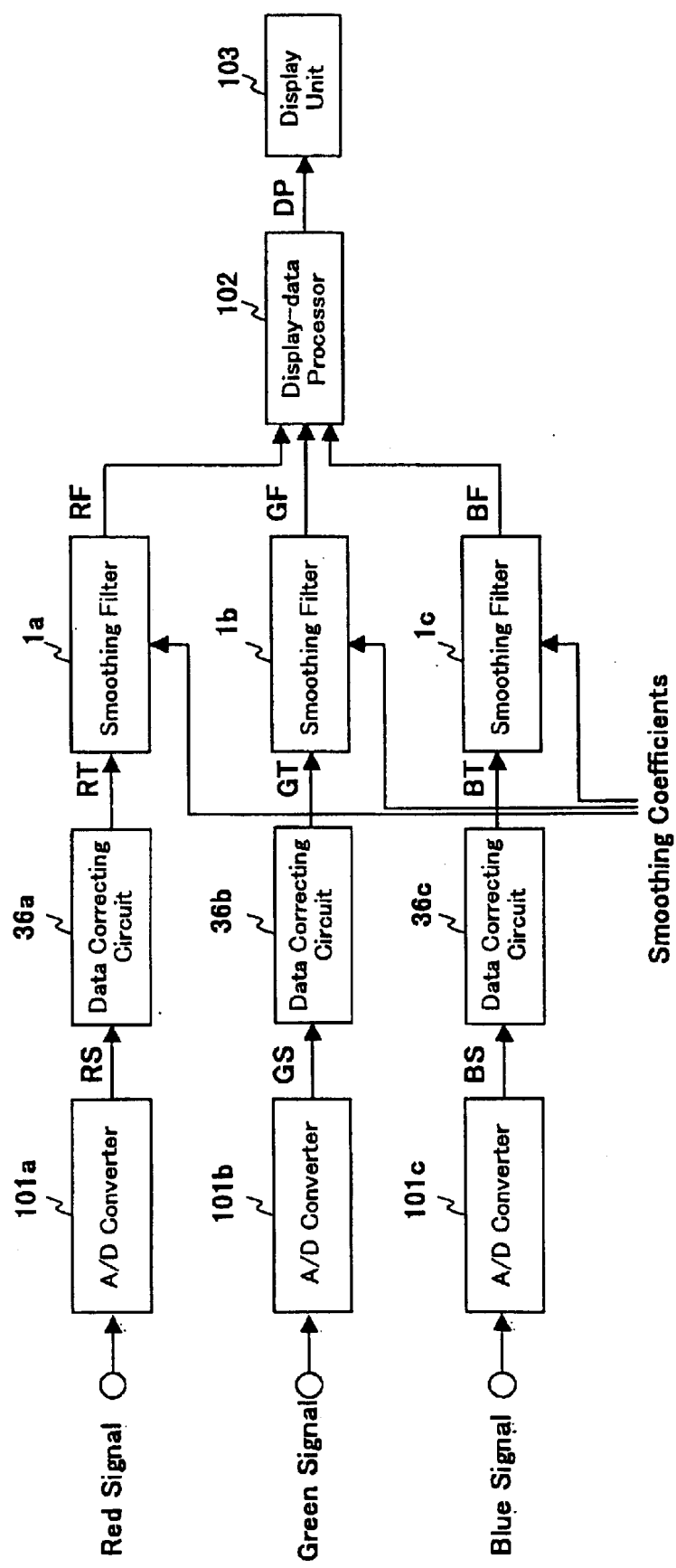
FIG. 27 is a block diagram illustrating a structure of a display device according to the seventh embodiment.
Figure 29:
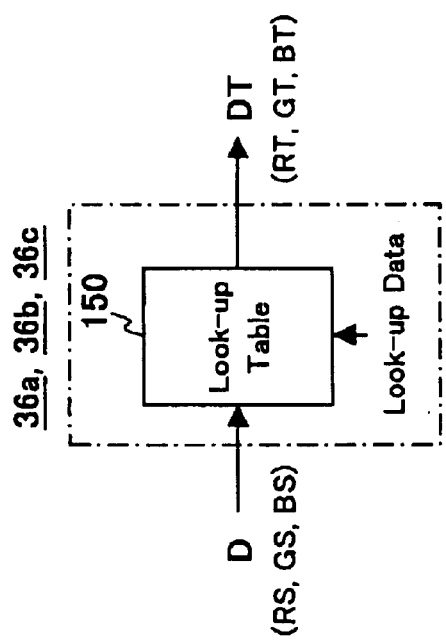
FIG. 29 is a diagram showing a structure of the data correcting circuit according to the seventh embodiment.
Figure 28:
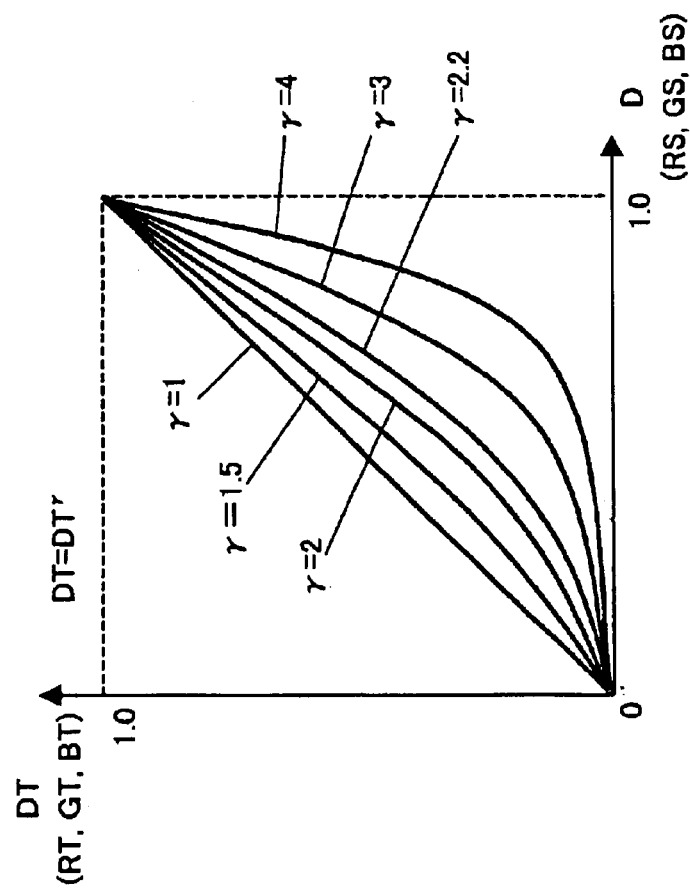
FIG. 28 is a diagram showing an input-output characteristic of a data correcting circuit according to the seventh embodiment.

FIG. 27 is a diagram illustrating a structure of a display device according to the seventh embodiment. The data correcting circuits 36a, 36b and 36c performs data correcting process on the first color element data RS, GS and BS so as to adjust luminous levels of the respective red, green and blue colors, according to the conditions in which the display device is used or to the user's taste. FIG. 28 is a diagram showing an input-output characteristic of the data correcting circuits 36a, 36b and 36c. As shown in FIG. 28, the data correcting circuits 36a, 36b and 36c have a non-linear characteristic. FIG. 29 is a diagram illustrating a structure of the data correcting circuits 36a, 36b and 36c. The look-up table 150 stores coefficients for correcting pixel data D in accordance with the characteristic shown in FIG. 28.

The data correcting circuits 36a, 36b and 36c are provided at the input of the smoothing filters 1a, 1b and 1c (not at the output) to prevent "false" color. When the data correcting process is performed after the smoothing process, "false" color occurs as described below.

Figure 30B:
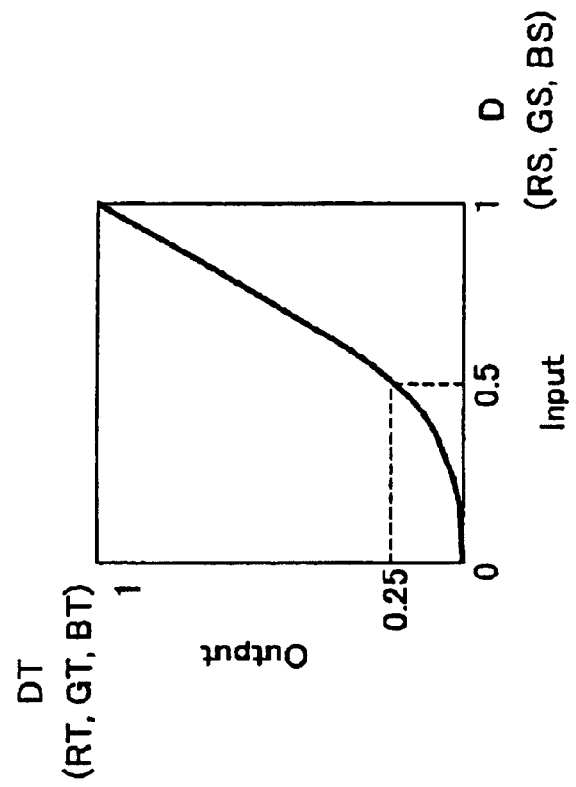
FIGS. 30A and 30B are diagrams for a purpose of explaining "false" color produced by correcting luminance levels of the respective red, green and blue colors.
Figure 30A:
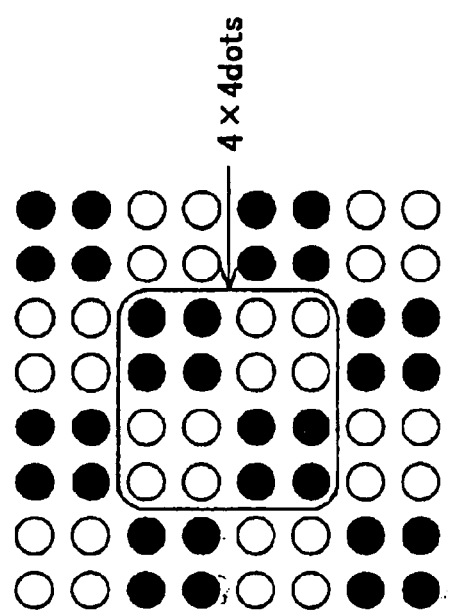

FIGS. 31A, 31B, 31C and 31D, are schematic diagrams illustrating the "false" color being produced when the pixel data is corrected after the smoothing process. FIG. 31A is showing value of the first color element data RS, GS and BS corresponding to 4×4 dots area of a first image shown in FIG. 30A. The first image shown in FIG. 30A consists of white dots and black dots, representing gray image. The white dots in the first image are represented by the first color element data (RS,GS,BS)=(1,1,1), while the black dots is represented by (RS,GS,BS)=(0,0,0). FIG. 31B is showing value of the second color element data RF, GF and BF obtained by performing the smoothing process on the first color element data shown in FIG. 31A, using smoothing coefficients K1=K2=K3=K4=0.25 (see FIG. 5A). FIG. 31C is showing value of the color element data RT, GT and BT obtained by correcting the second color element data shown in FIG. 31B in accordance with an input-output characteristic of the data correcting circuits 36a, 36b and 36c shown in FIG. 30B. FIG. 31D is showing a luminance level of each display element of the display unit 103 representing the image corresponding to the first image shown in FIG. 30A. The level of each light device is designated by the display-data DP obtained according to one of the color element data RT, GT or BT shown in FIG. 31C.

As shown in FIG. 31D, when the data correcting process is performed after the smoothing process, the total luminance of the respective red, green and blue display elements in the 4×4 dots area become 1(=0.125×8), 2(=1×2+0×2), and 1(=0.2×4), which means an image supposed to be displayed as gray looks greenish.

On the other hand, as shown in FIGS. 32A, 32B, 32C and 32D, when the data correcting process is performed before the smoothing process, no "false" color occurs. FIG. 32A is showing value of the first color element data RS, GS and BS corresponding to the 4×4 dots area of the first image shown in FIG. 30A. FIG. 32B is showing value of the color element data RT, GT and BT obtained by correcting the first color element data shown in FIG. 32A, in accordance with the characteristic shown in FIG. 30B. FIG. 32C is showing value of the second color element data RF, GF and BF obtained by performing the smoothing process on the color element data RT, GT and BT shown in FIG. 32B. FIG. 32D is showing luminance levels of the display elements representing an image corresponding to the first image shown in FIG. 30A. As shown in FIG. 32D, a total luminance level of the respective red, green and blue display elements become 2(=0.2×8), 2(=0.5×4), and 2(=0.5×4). That is, the total luminance of the respective red, green and blue display elements are in the ratio of 1:1:1, which means the display elements represents gray image without "false" color.

As discussed above, the data correcting circuits 36a, 36b and 36c must be provided at the input of the smoothing filters 1a, 1b and 1c, as shown in FIG. 27, so that the data correcting process is performed before the smoothing process.

Eighth Embodiment

Figure 33:
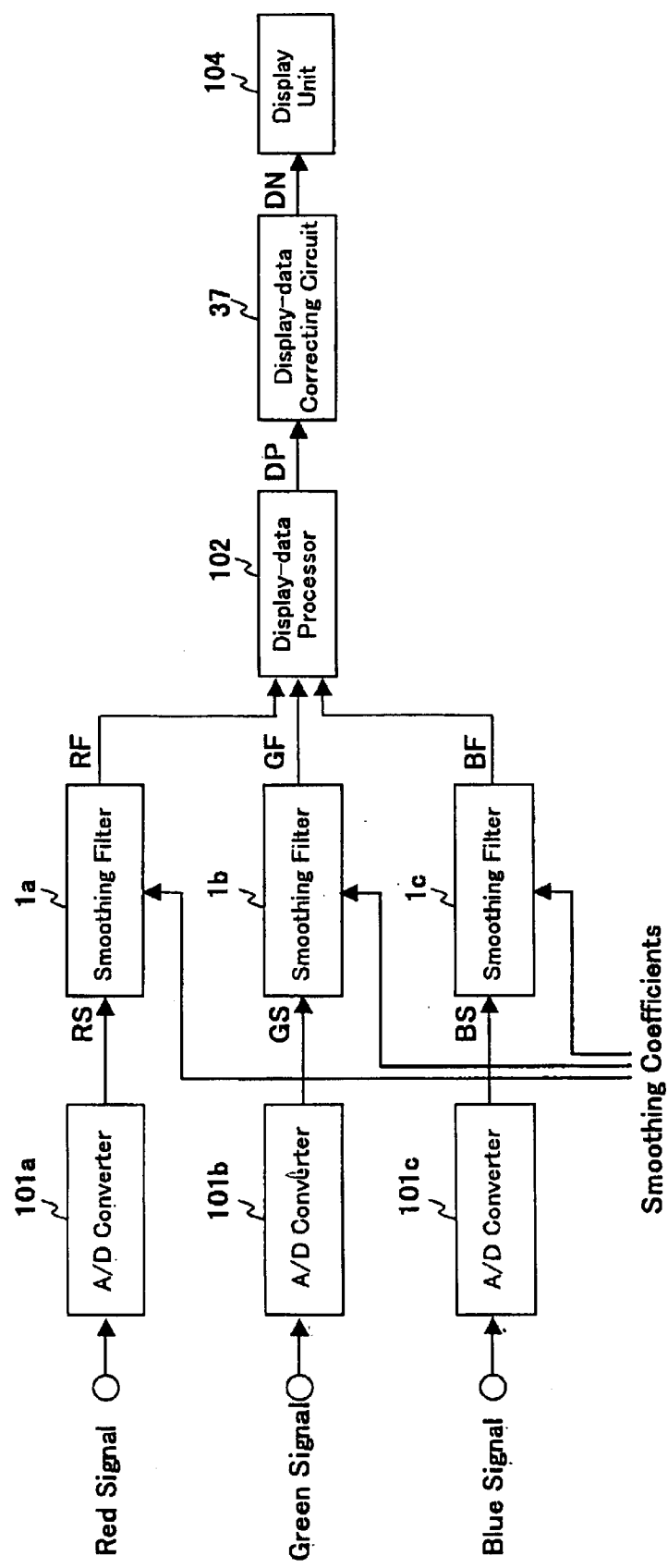
FIG. 33 is a diagram showing a structure of a display device according to the eighth embodiment.
Figure 34:
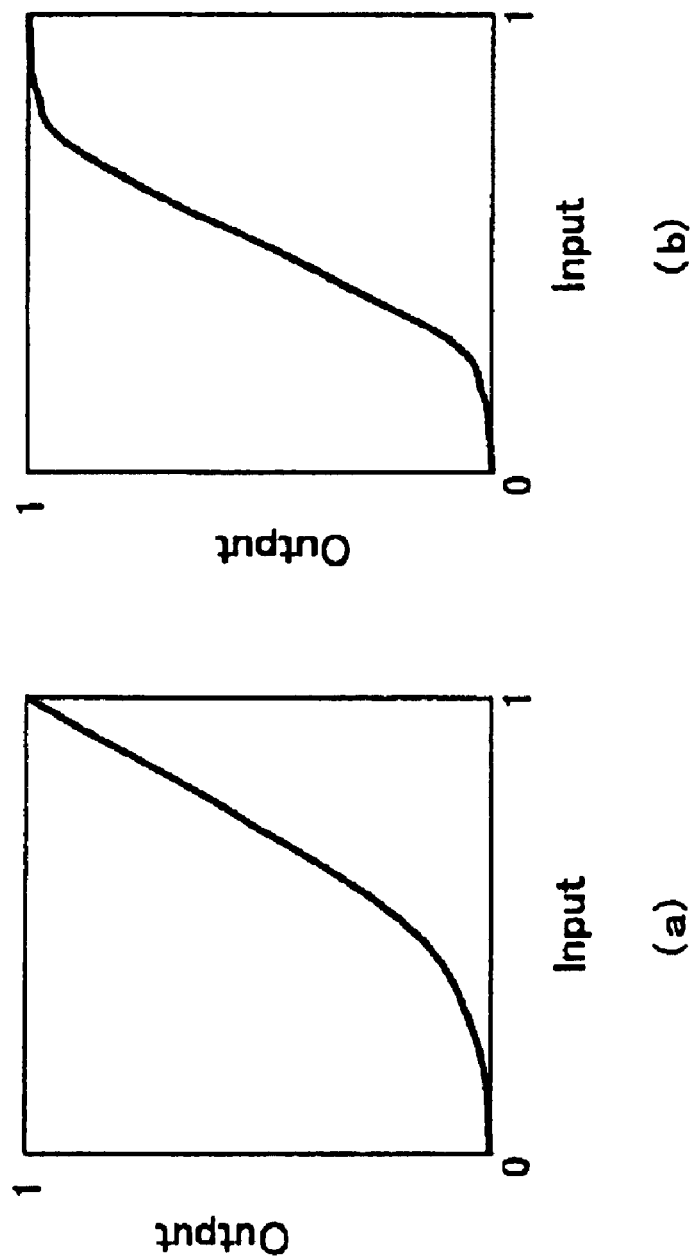
FIG. 34 is a diagram showing input-output characteristics of (a)CRTs and (b)LCDs.

FIG. 33 is a diagram illustrating a structure of a display device according to the eighth embodiment. As mentioned before, not only LEDs but also CRTs or LCDs which represent red, green and blue primary colors are employable for the display elements of the display unit 104. CRTs and LCDs, however, have none-linear characteristics, as shown in FIG. 34. FIG. 34 is a diagram showing (a)a current-versus-luminance characteristic of CRTs and (b)a voltage-versus-light-transmittance characteristic of LCDs. This means when CRTs or LCDs are employed as display elements of the display unit 104, the display-data DP needs to be corrected so that a linear relationship will exist between the display-data DP and a luminance level of each display element. The display-data correcting circuit 37 produce display-data DN so that a luminance level of each display element will be proportional to the display data DP.

Figure 35:
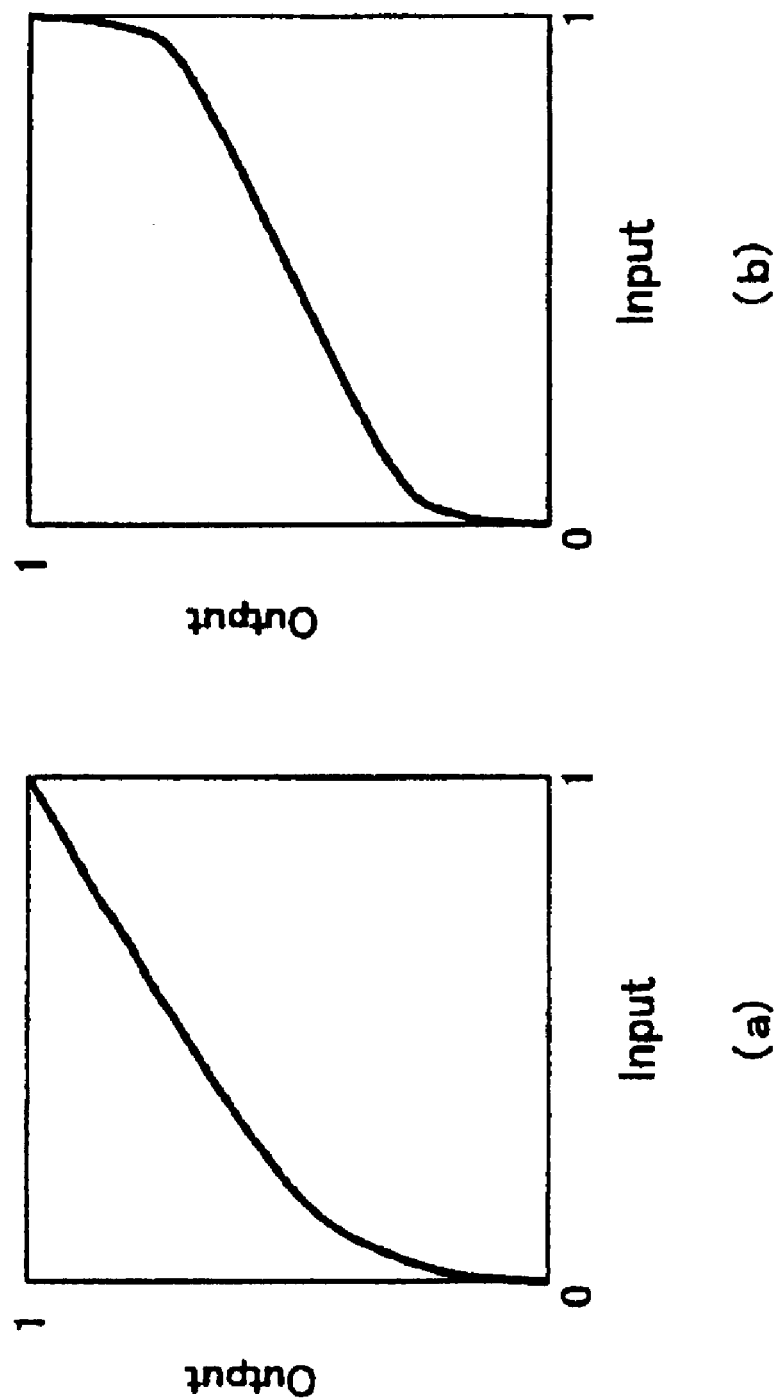
FIG. 35 is a diagram showing input-output characteristics of the display-data correcting circuit according to the eighth embodiment.

FIG. 35 is a diagram showing input-output characteristics of the display-data correcting circuit 37 when (a)CRTs and (b)LCDs are used for the display elements. As shown in FIG. 35, the input-output characteristics of the display-data correcting circuit 37 is an inverse of the current-versus-luminance characteristic of CRTs(a) or an inverse of the voltage-versus-light transmittance characteristic of LCDs (b). Therefore, the display-data DN, the output of the display-data correcting circuit 37, can be represented as DN=fn(DP), where fn(x) is an inverse of the function f(x) specifying the input-output characteristic of the display elements. At the same time, luminance level of the display unit 104 is expressed as f(DN)=f(fn(DP)).

By providing the display-data correcting circuit 37 at the input of the display unit 104, a faithful image can be produced in the display unit 104.

Ninth Embodiment

Figure 36:
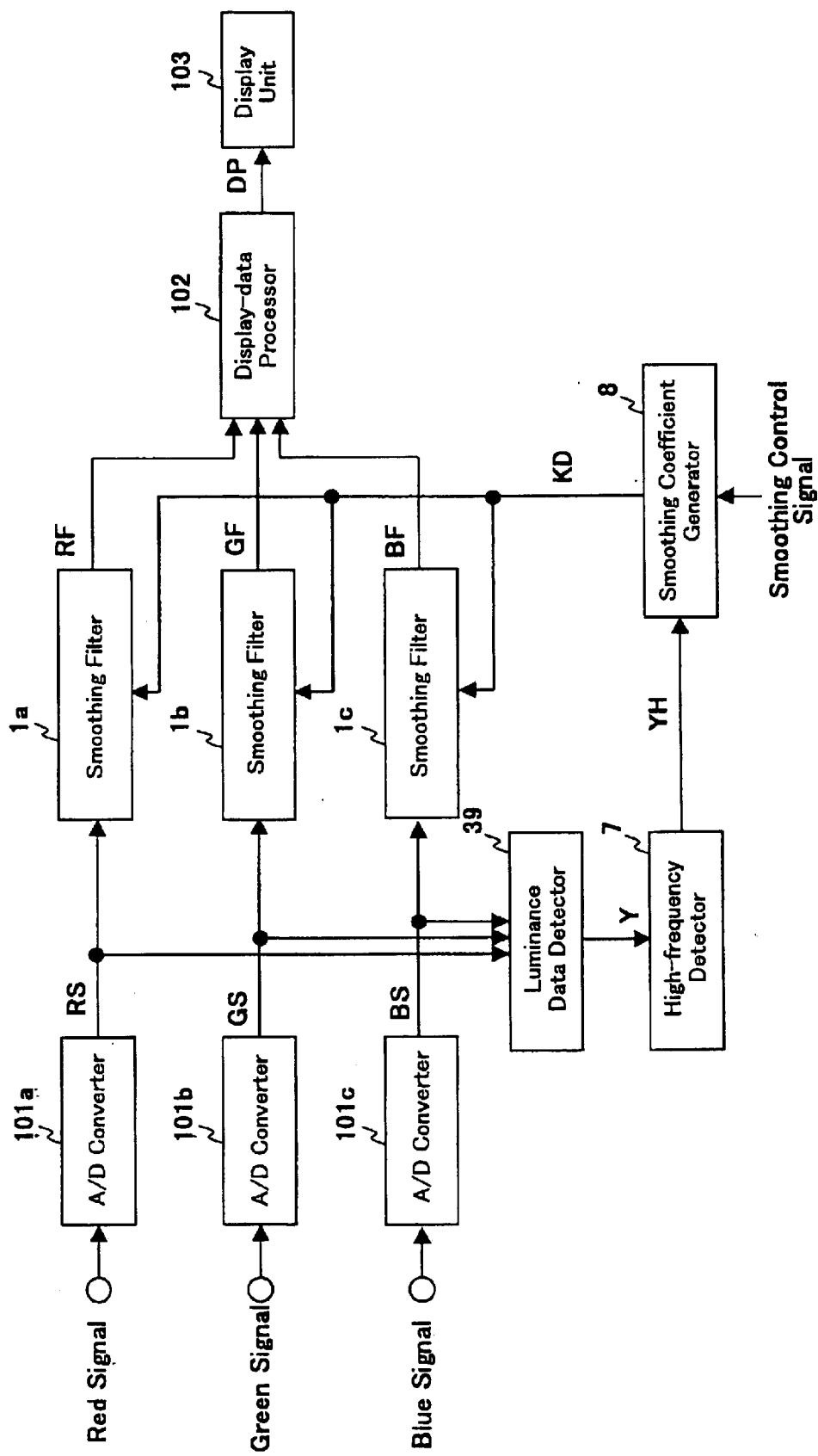
FIG. 36 is a diagram showing a structure of a display device according to the ninth embodiment.

FIG. 36 is a diagram showing a structure of a display device according to the ninth embodiment. The luminance data detector 39 produces a luminance data Y according to the first color element data RS, GS and BS, which are in the form of RGB color data. The luminance data Y is derived, for example, by the following equation:

$$Y=0.3 \times RS+0.59 \times GS+0.11 \times BS \tag{3}$$

The high-frequency detector 7 produces a high-frequency component data YH by performing the process discussed in the second and forth embodiment on the luminance data Y. The smoothing coefficient generator 8 generates smoothing coefficients KD on the basis of the high-frequency component data YH. The smoothing filters 1a, 1b and 1c perform the smoothing process on the first color element data RS, GS and BS using the smoothing coefficient KD produced by the smoothing coefficient generator 8.

In the display device according to this embodiment, the high-frequency component data YH can be produced by the single high-frequency detector 7, while the high-frequency component data DH (RH, GH and BH) are produced by three high-frequency detectors (see FIG. 9) in the display device according to the second embodiment.

Tenth Embodiment

Figure 37:
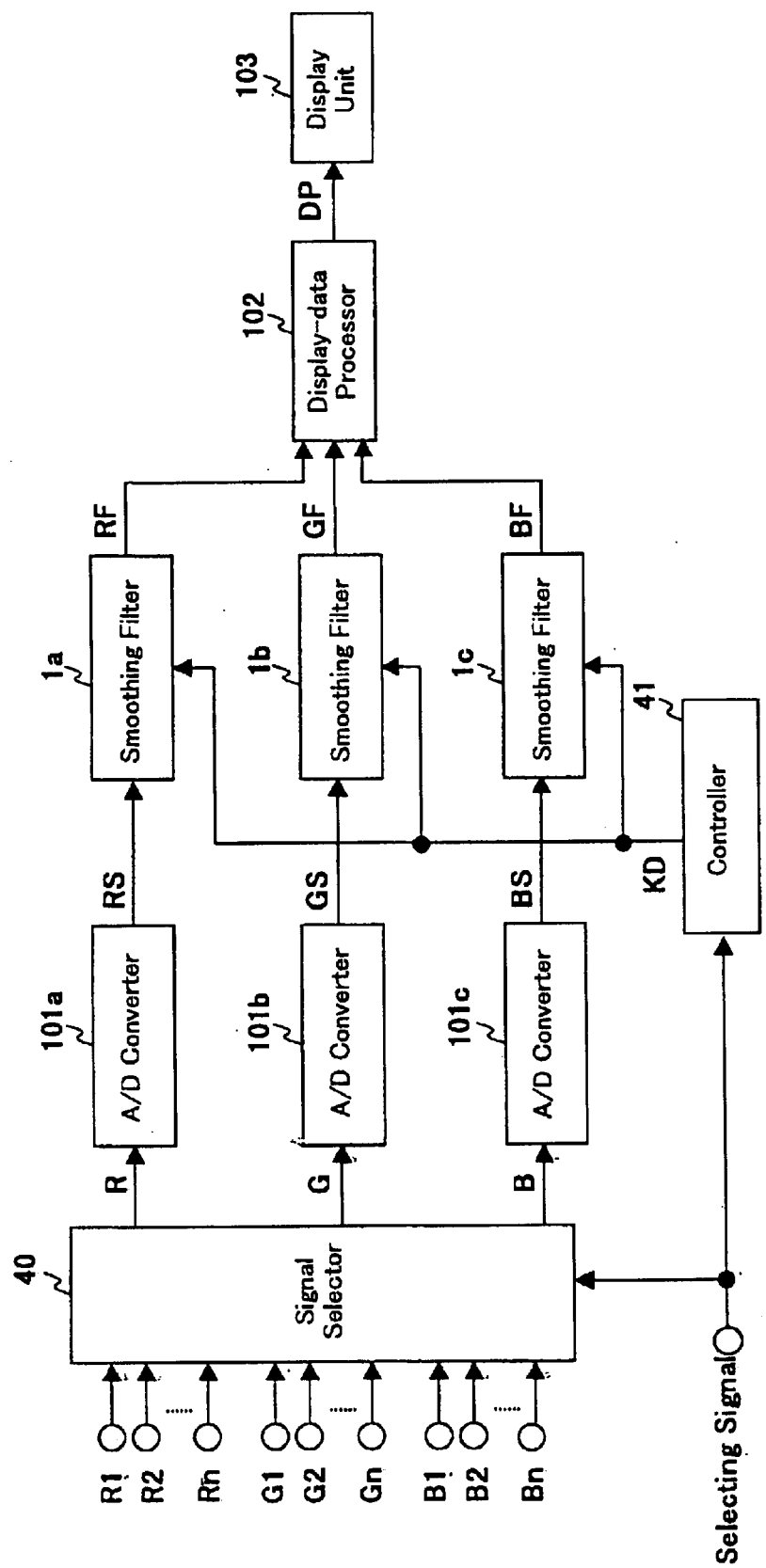
FIG. 37 is a diagram showing a structure of a display device according to the tenth embodiment.

FIG. 37 is a diagram illustrating a structure of a display device according to the tenth embodiment.

The signal selector 40 has plural input terminals R1, R2 ... Rn, G1, G2 ... Gn, B1, B2 ... Bn to which n types of image signals such as NTSC video signals, Hi-vision TV signals or the output image signals of PCs are introduced. The signal selector 40 selects one of the input signal according to the selecting signal supplied from the outside. The signal selector 40 sends red, green and Blue signal R, G and B of the selected input signal to the A/D converters 101a, 101b and 101c, respectively. The A/D converters 101a, 101b and 101c produce the first color element data RS, GS and BS by sampling each color signal R, G and B.

The controller 41 holds information related to properties of the image signals introduced to the signal selector 40. The controller 41 identifies a property of the selected image signal according to the selecting signal by accessing the information held by the controller 41, and generates smoothing coefficients KD on the basis of the property of the selected image signal. The property of the image signal is, for example, the number of pixels per frame, or a source of the image signal, PCs or TVs.

An image having a large pixel number tends to contain large amount of high-frequency components, while an image with a small pixel number tends to contain little amount of high-frequency components. Likewise, image signals of PCs which represent text or graphic information tends to contain large amount of high-frequency components, while image signals of TVs which represent "natural" images hardly contain high-frequency components. The controller 41 generates the smoothing coefficients KD on the basis of the property of the image signal to be displayed in order to prevent the "false" color effectively.

Eleventh Embodiment

Figure 38:
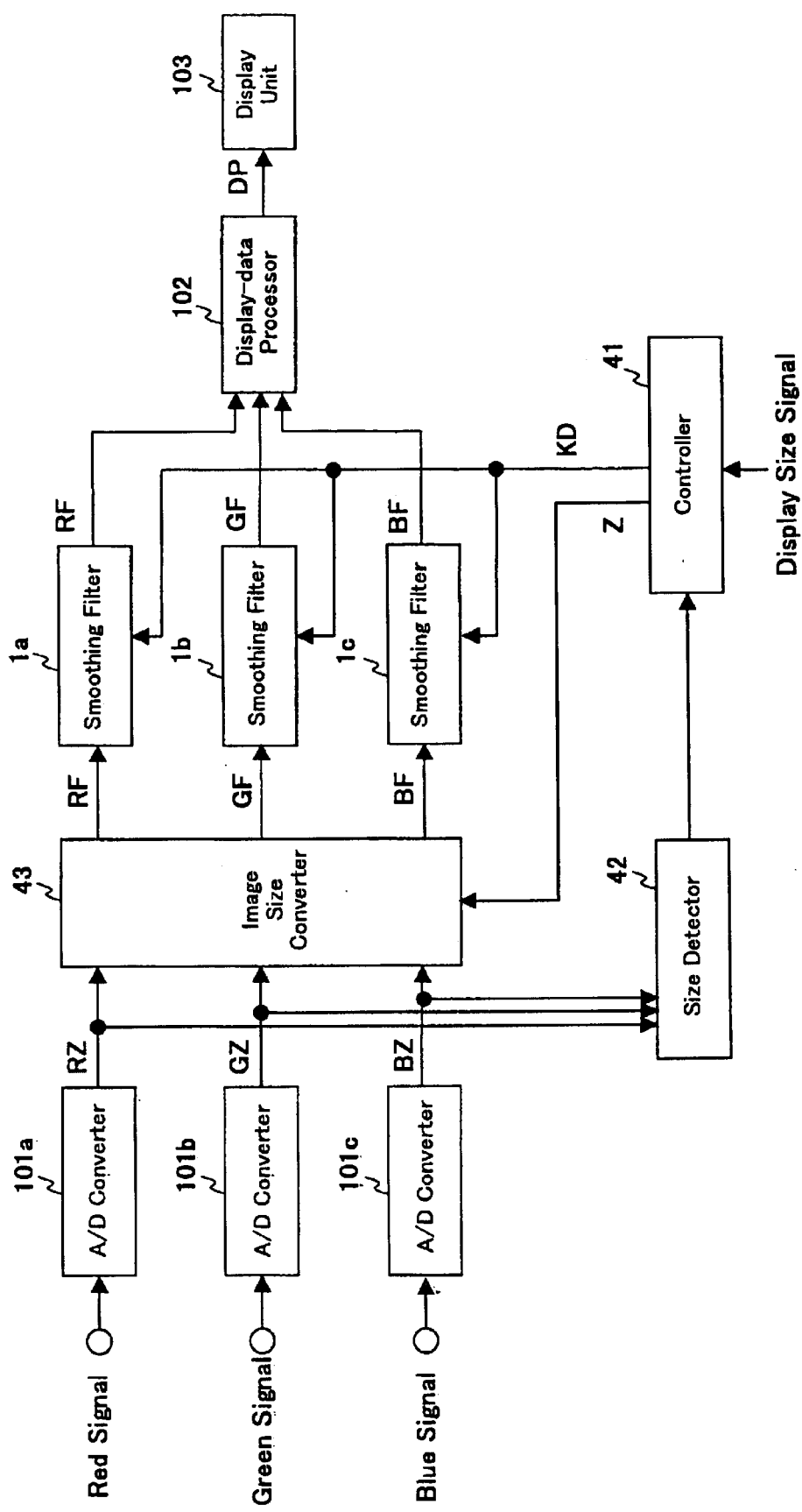
FIG. 38 is a diagram showing a structure of a display device according to the eleventh embodiment.
Figure 39:
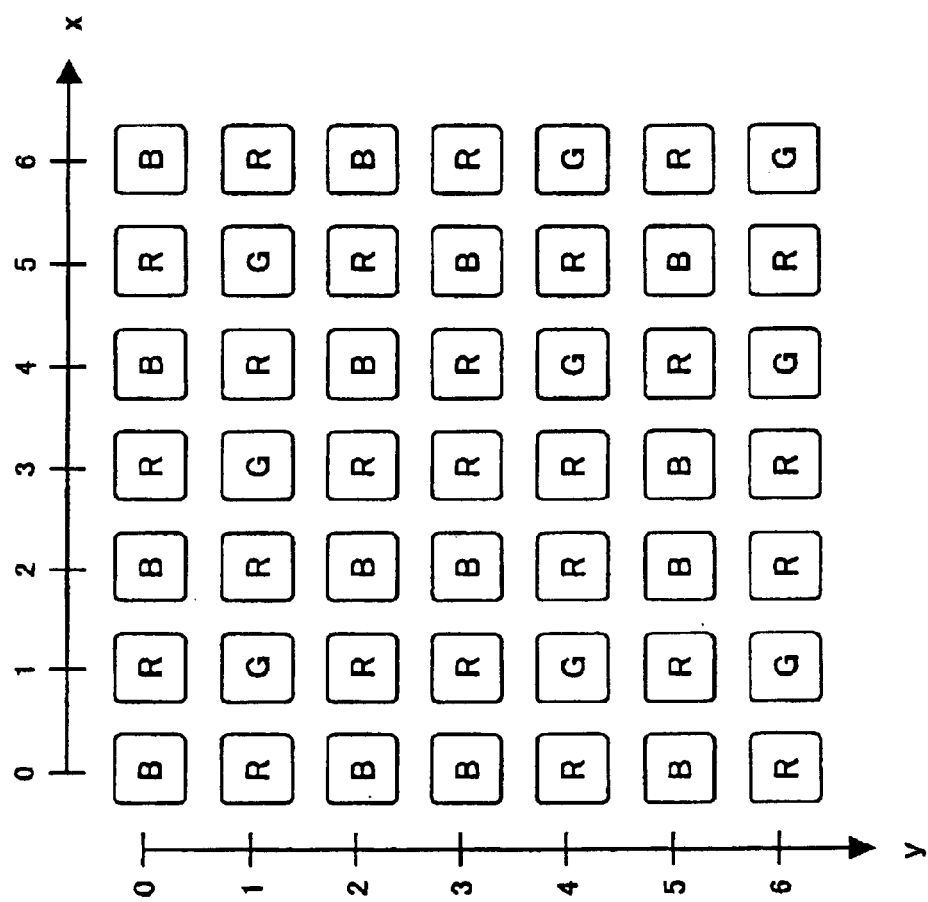
FIG. 39 is a schematic diagram showing an arrangement of display elements.

FIG. 38 is a diagram illustrating a structure of a display device according to the eleventh embodiment. The image size detector 42 detects image size on the basis of the horizontal and vertical pixel number of the first color element data RS, GS and BS, and sends data specifying the detected image size to the controller 41. The controller 41 calculates a scale Z for converting the first image size corresponding to the pixel number of the first color element data RS, GS and BS, to the second image size designated by the display size signal supplied from the outside. For example, when the first image size is 640×480 dots and the second image size is 1024×768 dots, the scale Z is equal to 1.6. The data specifying the scale Z is sent to the image size converter 43. The image size converter 43 performs an interpolation process on the first pixel data to increase or decrease the pixel number in accordance with the scale Z, thereby generating color element data RZ, GZ and BZ which represents an image with the second image size. The color element data RZ, GZ and BZ are sent to the smoothing filters 1a, 1b and 1c.

When the scale Z is larger than 1, particularly when the scale Z is equal to or more than twice, high-frequency components is lost by the interpolation process. Conversely, high-frequency components are increased when the scale Z is less than 1. Accordingly, the "false" color is more likely to occur when the scale Z is less than 1. The controller 41 generates the smoothing coefficients KD in accordance with the conversion scale Z, so that the amount of high-frequency components is decreased when the image is scaled down. Meanwhile when an image is scaled up, the controller 41 generates the smoothing coefficients KD so that no smoothing process is performed or the amount of high-frequency components eliminated by the smoothing process is decreased to prevent the image becoming blurry.

The controller 41 generates the-smoothing coefficient KD on the basis of the conversion scale Z, and the smoothing filters 1a, 1b and 1c perform the smoothing process on the color element data RZ, GZ and BZ, using the smoothing coefficients KD generated by the controller 41.

By adjusting the smoothing coefficients KD in accordance with the conversion scale Z, the image can be scaled down without causing "false" color.

What is claimed is:

1. A display device having plural display elements, each of which corresponds to a pixel representing at least one of three colors of red, green and blue, arranged in both horizontal and vertical directions, wherein each of said display elements emits one of said three colors, the display device comprising:

a pixel data generator for generating first pixel data consisting of three items of first color element data corresponding to luminance levels of red, green and blue colors, said first pixel data being generated for each of said display elements;

a smoothing filter for performing a smoothing process on said first pixel data in order to eliminate false colors in an image on the entire display, said smoothing filter modifying the luminance levels of said first pixel data, thereby producing second pixel data consisting of three items of second color element data corresponding to luminance levels of said respective colors; and a driver for driving each of said display elements in accordance with said second color element data.

2. The display device according to claim 1, wherein each of said display elements is driven on the basis of one of said second color element data corresponding to a color of each of said display elements.

3. The display device according to claim 1, wherein said second pixel data is obtained by calculating a weighted average value of said first pixel data representing more than one pixel.

4. The display device according to claim 3, wherein a contrast of a image to be represented by said display elements is controlled by varying a sum of weighting coefficients used for calculating said weighted average value.

5. The display device according to claim 1 further comprising a high-frequency detector for detecting an amount of high-frequency components contained in said first pixel data, wherein said smoothing filter performs said smoothing process on the basis of said amount of high-frequency components.

6. The display device according to claim 5 further comprising luminance data detector for producing a luminance data corresponding to said first pixel data, wherein said high-frequency detector detects an amount of said high-frequency components from said luminance data.

7. The display device according to claim 1 further comprising means for correcting said first color element data, thereby adjusting luminance levels of said respective colors.

8. The display device according to claim 1 further comprising means for correcting one of said second color element data corresponding to a color of each of said display elements so that a luminance level of each of said display elements will be proportional to said second color element data.

9. The display device according to claim 1 further comprising, a image size converter for converting a first image represented by said first pixel data into a second image with another size by converting pixel number of said first pixel data, wherein said smoothing filter performs said smoothing process on pixel data representing said second image in accordance with a scale for converting said first image into said second image.

10. The display device according to claim 1, further comprising a detector for determining a property of a image to be represented by said display elements, wherein said smoothing filter performs said smoothing process on the basis of said property of the image.

11. A method for displaying an image on a display device having plural display elements, each of which corresponds to a pixel representing at least one of three colors of red, green and blue, arranged in both horizontal and vertical directions wherein each of said display elements emits one of said three colors comprising:

generating first pixel data consisting of three items of first color element data corresponding to luminance levels of red, green and blue colors, said first pixel data being generated for each of said display elements;

performing a smoothing process on said first pixel data, in order to eliminate false colors in an image on the entire display, said smoothing process modifying the luminance levels of said first pixel data thereby producing second pixel data consisting of three items of second color element data corresponding to luminance levels of said respective colors; and driving each of said display elements in accordance with said second color element data.

12. The method for displaying image according to claim 11, wherein each of said display elements is driven on the basis of one of said second color element data corresponding to a color of each of said display elements.

13. The method for displaying image according to claim 11, wherein said second pixel data is obtained by calculating a weighted average value of said first pixel data representing more than one pixel.

14. The method for displaying image according to claim 13, wherein a contrast of a image to be represented by said display elements is controlled by varying a sum of weighting coefficients used for calculating said weighted average value.

15. The method for displaying image according to claim 11 further comprising detecting an amount of high-frequency components contained in said first pixel data, wherein said smoothing process is performed on the basis of an amount of said high-frequency components.

16. The method for displaying image according to claim 15 further comprising producing a luminance data corresponding to said first pixel data, wherein an amount of said high-frequency components is detected from said luminance data.

17. The method for displaying image according to claim 11 further comprising correcting said first color element data before said smoothing process.

18. The method for displaying image according to claim 11 further comprising correcting one of said second color element data corresponding to a color of each of said display elements so that a luminance level of each of said display elements will be proportional to said second color element data.

19. The method for displaying image according to claim 11 further comprising converting a first image represented by said first pixel data into a second image with another size by converting pixel number of said first pixel data, wherein said smoothing process is performed on pixel data representing said second image in accordance with a scale for converting said first image into said second image.

20. The method for displaying image according to claim 11, further comprising determining a property of a image to be represented by said display elements, wherein said smoothing process is performed on the basis of said property of the image.

* * * * *